(12) United States Patent
Taguchi

(10) Patent No.: US 11,149,722 B2
(45) Date of Patent: Oct. 19, 2021

(54) VARIABLE DISPLACEMENT REFRIGERANT COMPRESSOR HAVING A CONTROL VALVE ADAPTED TO ADJUST AN OPENING DEGREE OF A PRESSURE SUPPLY PASSAGE AND A SWITCHING VALVE IN THE PRESSURE SUPPLY PASSAGE CLOSER TO A CONTROLLED PRESSURE CHAMBER THAN THE CONTROL VALVE AND SWITCHING BETWEEN A FIRST STATE AND A SECOND STATE

(71) Applicant: SANDEN AUTOMOTIVE COMPONENTS CORPORATION, Isesaki (JP)

(72) Inventor: Yukihiko Taguchi, Isesaki (JP)

(73) Assignee: Sanden Automotive Components Corporation, Isesaki (JP)

( * ) Notice: Subject to any disclaimer, the term of this patent is extended or adjusted under 35 U.S.C. 154(b) by 409 days.

(21) Appl. No.: 16/348,927

(22) PCT Filed: Nov. 13, 2017

(86) PCT No.: PCT/JP2017/041577
§ 371 (c)(1),
(2) Date: May 10, 2019

(87) PCT Pub. No.: WO2018/101094
PCT Pub. Date: Jun. 7, 2018

(65) Prior Publication Data
US 2019/0316575 A1    Oct. 17, 2019

(30) Foreign Application Priority Data
Dec. 1, 2016 (JP) .............................. JP2016-234234

(51) Int. Cl.
F04B 27/10 (2006.01)
F04B 27/18 (2006.01)
F04B 49/12 (2006.01)

(52) U.S. Cl.
CPC .............. F04B 27/10 (2013.01); F04B 27/18 (2013.01); F04B 49/12 (2013.01)

(58) Field of Classification Search
CPC .......... F04B 27/18; F04B 27/10; F04B 27/12; F04B 49/12; F04B 2027/1813;
(Continued)

(56) References Cited

U.S. PATENT DOCUMENTS 4,850,810 A * 7/1989 Higuchi .............. F04B 27/1804
417/222.2
6,010,312 A   1/2000 Suitou et al.
(Continued)

FOREIGN PATENT DOCUMENTS

| JP | 10-103249 A | 4/1998 |
|----|-------------|--------|
| JP | 11-082315 A | 3/1999 |
| JP | 2016-108961 A | 6/2016 |

OTHER PUBLICATIONS

Japan Patent Office, International Search Report issued in International Application No. PCT/JP2017/041577, dated Feb. 13, 2018.

Primary Examiner — Patrick Hamo
Assistant Examiner — Benjamin Doyle
(74) Attorney, Agent, or Firm — Baker Botts L.L.P.

(57) ABSTRACT

A variable displacement compressor capable of preventing delay in pressure release of a controlled pressure chamber, such as a crank chamber. A switching valve (350) disposed downstream of a control valve of a pressure supply passage includes a main valve body (352) and a sub valve body (400). The main valve body (352) includes an internal passage (352d) providing communication between a first valve hole (104e1) communicating with a pressure supply (Continued)

passage (145a) between the control valve and the switching valve (350), and a second valve hole (151a) communicating with a pressure supply passage (145b) between the switching valve (350) and the crank chamber. The main valve body (352) provides communication between the second valve hole (151a) and a pressure release hole (351a1) communicating with the suction chamber, when pressure Pm in the pressure supply passage (145a) is lower than pressure Pc in the crank chamber. The sub valve body (400) closes the internal passage (352d) of the main valve body (352), when pressure Pm is lower than pressure Pc. The sub valve body (400) is lighter than the main valve body (352), and thus, when pressure Pm decreases, the sub valve body (400) actuates before the main valve body (352), to close the internal passage (352d) of the main valve body (352).

13 Claims, 15 Drawing Sheets

(58) Field of Classification Search
CPC ...... F04B 2027/1827; F04B 2027/1845; F04B 2027/1863; F04B 2027/24; F04B 2027/1854; F04B 2027/1859; F04B 2027/1868; F04B 2027/1881; F04B 27/1804; F16K 31/383
USPC .............................................. 417/222.2, 270
See application file for complete search history.

(56) References Cited

U.S. PATENT DOCUMENTS

| | | | | |
|---|---|---|---|---|
| 6,045,337 | A * | 4/2000 | Tokumasu | F04B 27/1804 417/213 |
| 6,074,173 | A * | 6/2000 | Taguchi | F04B 27/1804 417/222.2 |
| 6,263,687 | B1 * | 7/2001 | Ban | B60H 1/00914 417/222.2 |
| 6,481,977 | B2 * | 11/2002 | Mameda | F04B 27/1804 417/222.2 |
| 8,882,474 | B2 * | 11/2014 | Ota | F04B 27/1804 417/222.1 |
| 2002/0006339 | A1 * | 1/2002 | Ota | F04B 27/1081 417/222.2 |
| 2004/0258536 | A1 * | 12/2004 | Ota | F04B 27/1804 417/222.2 |
| 2005/0008499 | A1 * | 1/2005 | Umemura | F04B 39/16 417/222.2 |
| 2006/0080983 | A1 * | 4/2006 | Ota | F04B 27/1036 62/208 |
| 2011/0214564 | A1 * | 9/2011 | Okuda | F04B 27/1804 91/505 |
| 2012/0247140 | A1 * | 10/2012 | Yoshida | F04B 27/1804 62/228.3 |
| 2015/0184646 | A1 * | 7/2015 | Fukazawa | F04B 27/1804 137/535 |
| 2017/0356439 | A1 * | 12/2017 | Taguchi | F04B 27/1804 |

* cited by examiner

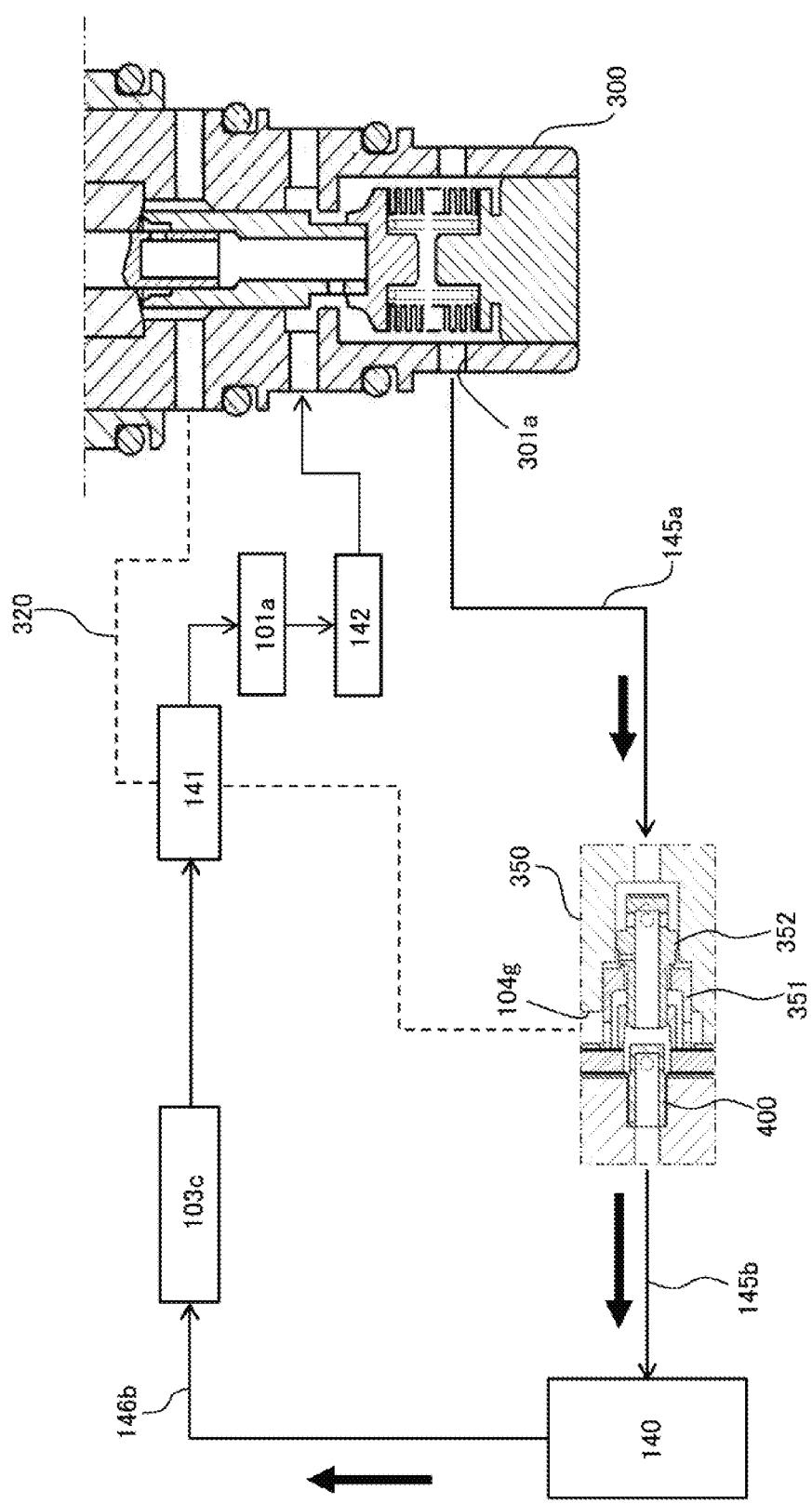

VARIABLE DISPLACEMENT REFRIGERANT COMPRESSOR HAVING A CONTROL VALVE ADAPTED TO ADJUST AN OPENING DEGREE OF A PRESSURE SUPPLY PASSAGE AND A SWITCHING VALVE IN THE PRESSURE SUPPLY PASSAGE CLOSER TO A CONTROLLED PRESSURE CHAMBER THAN THE CONTROL VALVE AND SWITCHING BETWEEN A FIRST STATE AND A SECOND STATE

CROSS-REFERENCE TO RELATED APPLICATIONS

This application is a U.S. National Stage Patent Application under 35 U.S.C. § 371 of International Patent Application No. PCT/JP2017/041577, filed on Nov. 13, 2017, which claims the benefit of Japanese Patent Application No. 2016-234234, filed on Dec. 1, 2016, the disclosures of each of which are incorporated herein by reference in their entirety.

TECHNICAL FIELD

The present invention relates to variable displacement compressors capable of changing discharge displacement in accordance with pressure in a controlled pressure chamber, such as a crank chamber.

BACKGROUND ART

As an example of a variable displacement compressor of this kind, a variable displacement compressor disclosed in Patent Document 1 includes: a first control valve that controls the opening degree of a pressure supply passage that provides communication between a discharge chamber and a crank chamber; and a second control valve that includes a spool having a first valve portion that opens and close a pressure supply passage between the first control valve and the crank chamber, and a second valve portion that opens and closes a pressure release passage communicating with a suction chamber of the crank chamber. The spool is configured so that, when the pressure in a pressure supply passage between the first control valve and the second control valve is higher than the pressure in the crank chamber, the first valve portion opens the pressure supply passage to supply a refrigerant from the discharge chamber to the crank chamber, and the second valve portion minimizes the opening degree of the pressure release passage. Furthermore, the spool is configured so that, when the pressure in the pressure supply passage between the first control valve and the second control valve is lower than the pressure in the crank chamber, the first valve portion closes the pressure supply passage to prevent backflow of the refrigerant flowing from the crank chamber toward the first control valve, and the second valve portion maximizes the opening degree of the pressure release passage.

REFERENCE DOCUMENT LIST

Patent Document

Patent Document 1: JP 2016-108961 A

SUMMARY OF THE INVENTION

Problem to be Solved by the Invention

In the abovementioned conventional variable displacement compressor, when the first control valve closes the pressure supply passage, the refrigerant in the pressure supply passage between the first control valve and the second control valve flows out into the suction chamber via a throttle passage. This causes the pressure in the pressure supply passage between the first control valve and the second control valve to decrease to the pressure in the suction chamber, to move the spool in a direction in which the opening degree of the pressure release passage is maximized.

However, the pressure supply passage between the first control valve and the second control valve also communicates with an internal passage of the spool having a greater passage cross-sectional area than that of the throttle passage. Thus, there is a concern that when the first control valve closes the pressure supply passage, a refrigerant flowing from the crank chamber into the pressure supply passage between the first control valve and the second control valve via the internal passage of the spool might prevent the pressure in the pressure supply passage between the first control valve and the second control valve from rapidly decreasing to the pressure in the suction chamber, resulting in a delay of movement of the spool, more specifically, a delay of release of a pressure in the crank chamber.

Thus, an object of the present invention is to provide a variable displacement compressor capable of preventing delay in release of pressure in a controlled pressure chamber, such as a crank chamber.

Means for Solving the Problem

According to an aspect of the present invention, a variable displacement compressor including a suction chamber into which a refrigerant, before being compressed, is introduced, a compression section that draws and compresses the refrigerant in the suction chamber, a discharge chamber into which the compressed refrigerant compressed by the compression section is discharged, and the controlled pressure chamber, in which a discharge displacement changes in accordance with a pressure in the controlled pressure chamber, is provided. The variable displacement compressor comprises: a control valve disposed in a pressure supply passage for supplying the refrigerant in the discharge chamber to the controlled pressure chamber, the control valve being adapted to adjust an opening degree of the pressure supply passage; a switching valve disposed in the pressure supply passage to be closer to the controlled pressure chamber than the control valve is, the switching valve switching between a first state in which the switching valve provides communication between a first valve hole communicating with a pressure supply passage between the control valve and the switching valve, and a second valve hole communicating with a pressure supply passage between the switching valve and the controlled pressure chamber, and a second state in which the switching valve provides communication between the second valve hole and a pressure release hole communicating with the suction chamber; and a throttle passage that provides communication between the pressure supply passage between the control valve and the switching valve, and the suction chamber. the switching valve comprises: a main valve body including an internal passage for providing communication between the first valve hole and the second valve hole, the main valve body being adapted to operate so that the main valve body blocks the communication between the second valve hole and the pressure release hole, when a pressure in the pressure supply passage between the control valve and the switching valve is higher than a pressure in the controlled pressure chamber, whereas the main valve body provides communication between the second valve hole and the pressure release hole, when the pressure in the pressure supply passage between the control valve and the switching valve is lower than the pressure in the controlled pressure chamber; and a sub valve body adapted to operate so that the sub valve body opens the internal passage of the main valve body, when the pressure in the pressure supply passage between the control valve and the switching valve is higher than the pressure in the controlled pressure chamber, whereas the sub valve body closes the internal passage of the main valve body, when the pressure in the pressure supply passage between the control valve and the switching valve is lower than the pressure in the controlled pressure chamber. The sub valve body is formed to be lighter than the main valve body, and the sub valve body actuates before the main valve body to close the internal passage of the main valve body, when the control valve closes the pressure supply passage and the pressure in the pressure supply passage between the control valve and the switching valve decreases.

Effects of the Invention

In the variable displacement compressor, when the control valve closes the pressure supply passage and the pressure in the pressure supply passage between the control valve and the switching valve decreases, the sub valve body actuates before the main valve body, to close the internal passage of the main valve body. Thus, the refrigerant from the controlled pressure chamber is prevented from flowing into the pressure supply passage between the control valve and the switching valve, and the pressure in the pressure supply passage between the control valve and the switching valve rapidly decreases to the pressure in the suction chamber, compared with the conventional one. Thus, it is possible to prevent the delay of movement of the main valve body in a direction providing communication between the second valve hole and the pressure release hole, and the delay of release of the pressure in the controlled pressure chamber caused thereby.

BRIEF DESCRIPTION OF THE DRAWINGS

FIGS. 4A and 4B are cross-sectional views of the main part of the control valve, in which FIG. 4A illustrates a state in which a throttle passage provided inside the control valve is open, and FIG. 4B illustrates a state in which the throttle passage is closed.

FIGS. 8A and 8B are views for describing the operation of the switching valve, in which FIG. 8A illustrates a state in which a pressure is supplied to a crank chamber, and FIG. 8B illustrates a state in which the pressure in the crank chamber is released.

FIG. 9 is a diagram for describing the operation of the variable displacement compressor (mainly, the control valve and the switching valve).

MODE FOR CARRYING OUT THE INVENTION

Figure 1:
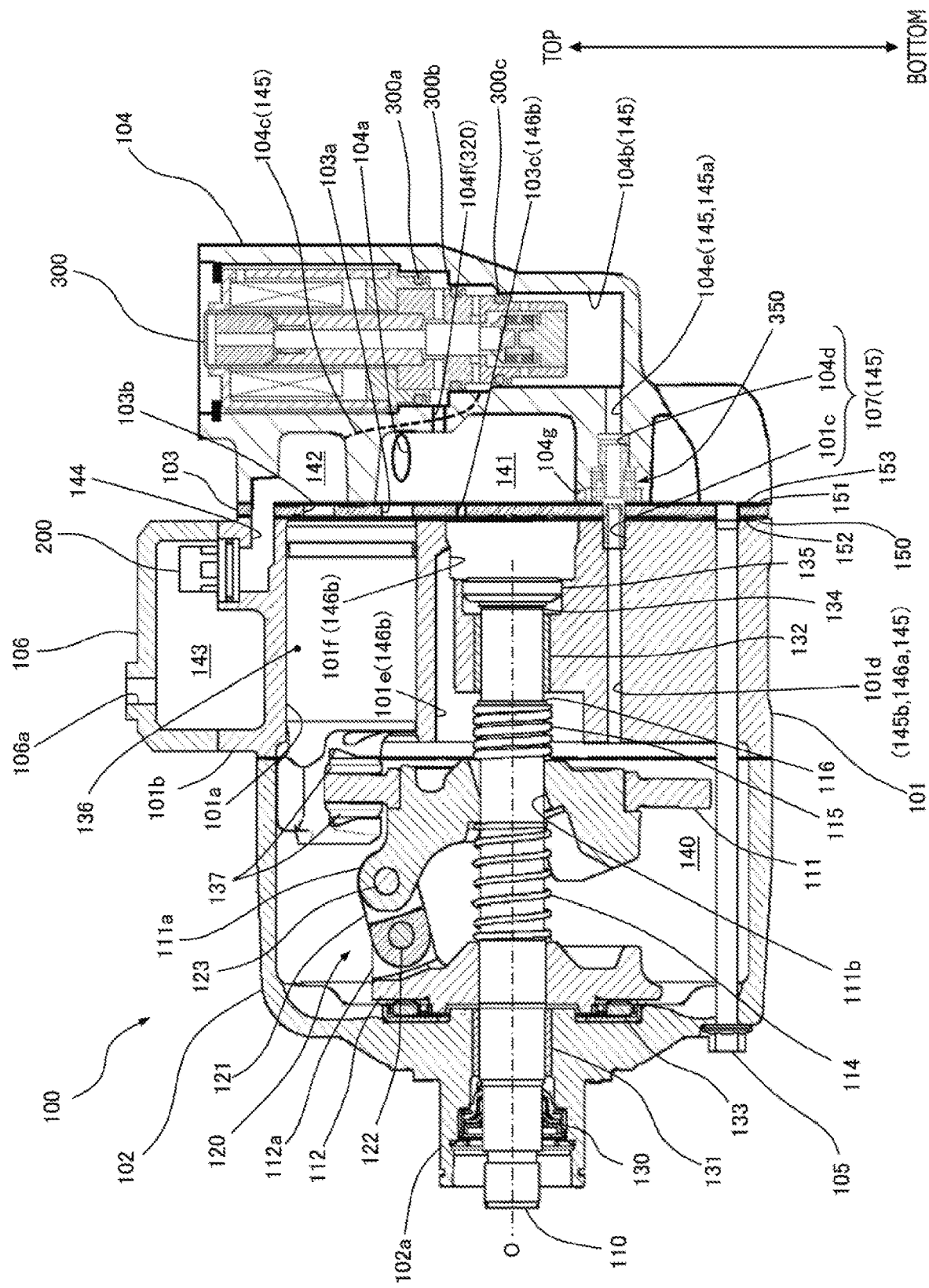
FIG. 1 is a cross-sectional view of a variable displacement compressor according to an embodiment of the present invention.

Hereinbelow, embodiments of the present invention will be described with reference to the accompanying drawings. A variable displacement compressor according to the embodiments is configured as a clutch-less compressor mainly applied to air conditioning systems for vehicles.
Overall Configuration of Variable Displacement Compressor FIG. 1 is a cross-sectional view of a variable displacement compressor 100 according to an embodiment of the present invention. As illustrated in FIG. 1, the variable displacement compressor 100 includes: a cylinder block 101 in which multiple cylinder bores 101a are formed; a front housing 102 provided on one end of the cylinder block 101; and a cylinder head 104 provided on the other end of the cylinder block 101 via a valve plate 103. The cylinder block 101, the front housing 102, the valve plate 103 and the cylinder head 104 are fastened by multiple through bolts 105 to constitute a compressor housing.

The cylinder block 101 and the front housing 102 form a crank chamber 140, and a drive shaft 110 rotatably supported by the compressor housing is provided so as to traverse the inside of the crank chamber 140. A center gasket (not illustrated) is arranged between the front housing 102 and the cylinder block 101. A cylinder gasket 152, a suction valve forming plate 150, a discharge valve forming plate 151 and a head gasket 153 are arranged between the cylinder block 101 and the cylinder head 104, in addition to the valve plate 103.

A swash plate 111 is disposed around an axially intermediate portion of the drive shaft 110. The swash plate 111 is coupled, via a linkage 120, to a rotor 112 secured to the drive shaft 110, and rotates with the drive shaft 110. The swash plate 111 is configured so that the angle (inclination angle) thereof with respect to a plane orthogonal to the axis O of the drive shaft 110 is changeable. The linkage 120 has: a first arm 112a protruding from the rotor 112; a second arm 111a protruding from the swash plate 111; and a link arm 121 having one end rotatably connected to the first arm 112a via a first connecting pin 122, and the other end rotatably connected to the second arm 111a via a second connecting pin 123.

A through hole 111b of the swash plate 111, through which the drive shaft 110 is inserted, is formed in such a shape that the swash plate 111 is capable of inclining within a range between a maximum inclination angle and a minimum inclination angle. In the through hole 111b, a minimum inclination angle regulating portion that is adapted to contact the drive shaft 110, is formed. In a case in which the inclination angle of the swash plate 111, when the swash plate 111 is orthogonal to the axis O of the drive shaft 110 is 0° (the minimum inclination angle), the minimum inclination angle regulating portion of the through hole 111b is formed such that the minimum inclination angle regulating portion contacts the drive shaft 110, when the inclination angle of the swash plate 111 is substantially 0°, to regulate further inclination of the swash plate 111. When the inclination angle of the swash plate 111 reaches the maximum inclination angle, the swash plate 111 contacts the rotor 112 so that further inclining motion is restricted.

On the drive shaft 110, there are fitted an inclination angle decreasing spring 114 that urges the swash plate 111 in a direction in which the inclination angle of the swash plate 111 decreases, and an inclination angle increasing spring 115 that urges the swash plate 111 in a direction in which the inclination angle of the swash plate 111 increases. The inclination angle decreasing spring 114 is fitted between the swash plate 111 and the rotor 112, and the inclination angle increasing spring 115 is fitted between the swash plate 111 and a spring support member 116 secured to the drive shaft 110. In the present embodiment, when the inclination angle of the swash plate 111 is the minimum inclination angle, the biasing force of the inclination angle increasing spring 115 is set to be greater than that of the inclination angle decreasing spring 114. Accordingly, when the drive shaft 110 is not rotating, the swash plate 111 is positioned at an inclination angle at which the biasing force of the inclination angle decreasing spring 114 and that of the inclination angle increasing spring 115 are balanced.

One end (the left end in FIG. 1) of the drive shaft 110 extends through a boss 102a of the front housing 102 to the outside of the front housing 102. A power transmission device (not illustrated) is connected to the one end of the drive shaft 110. A shaft sealing device 130 is arranged between the drive shaft 110 and the boss 102a, and the interior of the crank chamber 140 is isolated from the exterior.

A coupled body of the drive shaft 110 and the rotor 112 is supported by bearings 131 and 132 in the radial direction, and is supported by a bearing 133 and a thrust plate 134 in the thrust direction. The drive shaft 110 (and the rotor 112) is configured to be rotated in synchronization with the rotation of the power transmission device by the power from the external drive source transmitted to the power transmission device. A clearance between the other end of the drive shaft 110, that is, the end on a thrust plate 134 side, and the thrust plate 134, is adjusted to a predetermined distance by an adjust screw 135.

In each cylinder bore 101a, a piston 136 is disposed. An inner space formed in a protruding portion of the piston 136 protruding into the crank chamber 140, accommodates an outer peripheral portion of the swash plate 111 and the vicinity thereof. The swash plate 111 is configured to work together with the piston 136 via a pair of shoes 137. Thus, the piston 136 reciprocates in the cylinder bore 101a as the swash plate 111 rotates in accordance with the rotation of the drive shaft 110. That is, rotational motion of the drive shaft 110 is converted into reciprocating motion of the piston 136 by a conversion mechanism including the swash plate 111, the linkage 120, the pair of shoes 137, and the like.

In the cylinder head 104, there are formed a suction chamber 141 arranged substantially at the center, and a discharge chamber 142 annularly surrounding the suction chamber 141. The suction chamber 141 communicates with the cylinder bore 101a through a communication hole 103a provided in the valve plate 103 and a suction valve (not illustrated) formed in the suction valve forming plate (not illustrated). The discharge chamber 142 communicates with the cylinder bore 101a through a discharge valve (not illustrated) formed in the discharge valve forming plate (not illustrated) and a communication hole 103b provided in the valve plate 103.

A muffler is provided at the top of the cylinder block 101. The muffler is formed by fastening a lid member 106 in which a discharge port 106a is formed, and a muffler forming wall 101b formed at the top of the cylinder block 101, with a bolt via a sealing member (not illustrated).

A muffler space 143 surrounded by the lid member 106 and the muffler forming wall 101b communicates with the discharge chamber 142 through a communication passage 144. In the muffler space 143, a discharge check valve 200 is disposed. The discharge check valve 200 is disposed at the connecting portion between the communication passage 144 and the muffler space 143. The discharge check valve 200 actuates in response to a pressure difference between the communication passage 144 (upstream side) and the muffler space 143 (downstream side), so that the discharge check valve 200 closes the communication passage 144 when the pressure difference is less than a predetermined value, whereas the discharge check valve 200 opens the communication passage 144 when the pressure difference is greater than the predetermined value.

The communication passage 144, the discharge check valve 200, the muffler space 143, and the discharge port 106a constitute a discharge passage of the variable displacement compressor 100. The discharge chamber 142 is connected to a refrigerant circuit (high-pressure side) of the air conditioning system through the discharge passage.

In the cylinder head 104, a suction passage constituted by a suction port (not illustrated) and a communication passage 104a are formed. The suction passage extends linearly from a radially outside of the cylinder head 104 to cross a part of the discharge chamber 142. The suction chamber 141 is connected to the refrigerant circuit (low-pressure side) of the air conditioning system through the suction passage.

A refrigerant at the low-pressure side (i.e., refrigerant before being compressed) of the refrigerant circuit of the air conditioning system is introduced into the suction chamber 141 through the suction passage. The refrigerant in the suction chamber 141 is drawn into the cylinder bore 101a by the reciprocating motion of the piston 136, and then, is compressed and discharged into the discharge chamber 142. That is, in the present embodiment, the cylinder bore 101a and the piston 136 constitute a compression section that compresses the refrigerant in the suction chamber 141. The refrigerant (compressed refrigerant) discharged into the discharge chamber 142 is introduced into the refrigerant circuit on the high-pressure side of the air conditioning system through the discharge passage.

Furthermore, the variable displacement compressor 100 has a pressure supply passage 145 that provides communication between the discharge chamber 142 and the crank chamber 140 to supply the refrigerant (discharged refrigerant) in the discharge chamber 142 to the crank chamber 140. In the present embodiment, the pressure supply passage 145 includes: a part of a first accommodation chamber 104b formed in the cylinder head 104; a communication passage 104c that provides communication between the discharge chamber 142 and the first accommodation chamber 104b; a second accommodation chamber 107 constituted by a cylinder head-side recess 104d and a cylinder block-side recess 101c; a communication passage 104e that provides communication between the first accommodation chamber 104b and the second accommodation chamber 107; and a communication passage 101d that provides communication between the second accommodation chamber 107 and the crank chamber 140.

The cylinder head-side recess 104d is formed in a connecting surface of the cylinder head 104 facing the cylinder block 101, and the cylinder block-side recess 101c is formed in a connecting surface of the cylinder block 101 facing the cylinder head 104 so as to be opposed to the cylinder head-side recess 104d. The first accommodation chamber 104b communicates with the suction chamber 141 through a communication passage 104f, and the second accommodation chamber 107 (here, corresponding to the cylinder head-side recess 104d) communicates with the suction chamber 141 through a communication passage 104g.

The pressure supply passage 145 is provided with a control valve 300 and a switching valve 350. The switching valve 350 is disposed downstream (on the crank chamber 140 side) of the control valve 300 in the pressure supply passage 145. Specifically, the control valve 300 is disposed in the first accommodation chamber 104b, and the switching valve 350 is disposed in the second accommodation chamber 107. In the present embodiment, O-rings 300a to 300c are attached to the control valve 300, and the O-rings 300a to 300c define, in the first accommodation chamber 104b, a first region that communicates with the suction chamber 141 through the communication passage 104f, a second region that communicates with the discharge chamber 142 through the communication passage 104c, and a third region that communicates with the second accommodation chamber 107 through the communication passage 104e. The second and third regions of the first accommodation chamber 104b constitute a part of the pressure supply passage 145.

In the following, for convenience of description, a region between the control valve 300 and the switching valve 350 in the pressure supply passage 145 is referred to as "pressure supply passage 145a between the control valve 300 and the switching valve 350", and a region between the switching valve 350 and the crank chamber 140 in the passage supply passage 145 is referred to as "pressure supply passage 145b between the switching valve 350 and the crank chamber 140". In the present embodiment, the pressure supply passage 145a between the control valve 300 and the switching valve 350 mainly includes the third region of the first accommodation chamber 104b and the communication passage 104e, and the pressure supply passage 145b between the switching valve 350 and the crank chamber 140 mainly includes the communication passage 101d.

The control valve 300 is configured so that the control valve 300 adjusts the opening degree (passage cross-sectional area) of the pressure supply passage 145 in response to a pressure in the suction chamber 141, which is introduced through the communication passage 104f, and in response to an electromagnetic force generated by a current flowing through a solenoid according to an external signal, to control a supply amount (pressure supply amount) of the refrigerant (discharged refrigerant) in the discharge chamber 142 supplied to the crank chamber 140.

By adjusting the opening degree of the pressure supply passage 145 by the control valve 300, it is possible to change (i.e., increase or decrease) the pressure in the crank chamber 140, so as to decrease or increase the inclination angle of the swash plate 111, that is, the stroke of the piston 136, to thereby change the discharge displacement of the variable displacement compressor 100. That is, the variable displacement compressor 100 is configured so that the state of the compression section (specifically, the stroke of the piston 136) changes in accordance with the pressure in the crank chamber 140, to change the discharge displacement. In other words, in the variable displacement compressor 100, the crack chamber 140 changes the state of the compression section in accordance with the internal pressure, to change the discharge displacement. Thus, in the present embodiment, the crank chamber 140 corresponds to a "controlled pressure chamber" of the present invention.

Specifically, by changing the pressure in the crank chamber 140, it is possible to change the inclination angle of the swash plate 111 by utilizing the pressure difference between the front side and the rear side of each piston 136, that is, the pressure difference between a compression chamber in the cylinder bore 101a and the crank chamber 140, which are on both sides across the piston 136, so that the stroke amount of the piston 136 changes, so as to change the discharge displacement of the variable displacement compressor 100. Specifically, when the pressure in the crank chamber 140 is decreased, the inclination angle of the swash plate 111 increases, so that the stroke amount of the piston 136 increases, and accordingly, the discharge displacement of the variable displacement compressor 100 increases.

The switching valve 350 is configured to switch between a first state in which the switching valve 350 provides communication between the pressure supply passage 145a between the control valve 300 and the switching valve 350 and the pressure supply passage 145b between the switching valve 350 and the crank chamber 140, and a second state in which the switching valve 350 provides communication between the pressure supply passage 145b between the switching valve 350 and the crank chamber 140, and the suction chamber 141.

Figure 5:
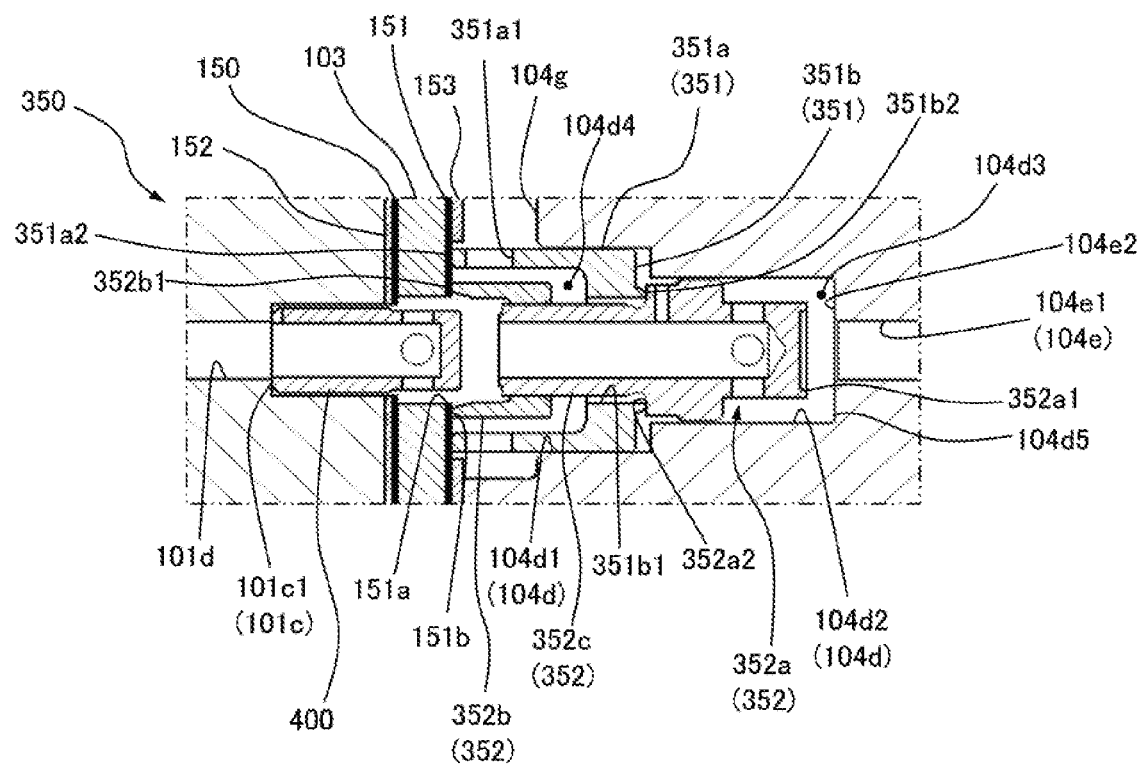
FIG. 5 is a cross-sectional view illustrating a switching valve according to a first embodiment of the variable displacement compressor.

Specifically, as illustrated in FIG. 5, the first state of the switching valve 350 is established by providing communication between a first valve hole 104e1 communicating with the pressure supply passage 145a between the control valve 300 and the switching valve 350, and a second valve hole 151a communicating with the pressure supply passage 145b between the switching valve 350 and the crank chamber 140. In this case, the communication between the pressure supply passage 145b between the switching valve 350 and the crank chamber 140, and the communication passage 104g, is blocked, and simultaneously, the pressure supply passage 145a between the control valve 300 and the switching valve 350 communicates with the pressure supply passage 145b between the switching valve 350 and the crank chamber 140. This allows the discharged refrigerant in the discharge chamber 142 to be supplied to the crank chamber 140.

The second state of the switching valve 350 is established by providing communication between the second valve hole 151a and a pressure release hole 351a1 communicating with the suction chamber 140. In this case, the communication between the pressure supply passage 145a between the control valve 300 and the switching valve 350 and the pressure supply passage 145b between the switching valve 350 and the crank chamber 140 is blocked, and simultaneously, the pressure supply passage 145b between the switching valve 350 and the crank chamber 140 communicates with the communication passage 104g, so that the pressure supply passage 145b between the switching valve 350 and the crank chamber 140 provides communication between the crank chamber 140 and the suction chamber 141, and accordingly, functions as a pressure release passage that allows the refrigerant in the crank chamber 140 to flow out into the suction chamber 141 (hereinafter, referred to as "first pressure release passage 146a").

In other words, in the first state, the switching valve 350 opens the pressure supply passage 145 and closes the first pressure release passage 146a. In the second state, the switching valve 350 closes the pressure supply passage 145 and opens the first pressure release passage 146a.

In the present embodiment, the crank chamber 140 always communicates with the suction chamber 141 through a passage routed via a communication passage 101e, a space 101f, and a fixed throttle 103c formed in the valve plate 103, so that the refrigerant in the crank chamber 140 flows out through the passage into the suction chamber 141. That is, the passage routed via the fixed throttle 103c constitutes a pressure release passage that provides communication between the crank chamber 140 and the suction chamber 141 and allows the refrigerant in the crank chamber 140 to flow out into the suction chamber 141 (hereinafter, referred to as "second pressure release passage 146b").

That is, the variable displacement compressor 100 according to the present embodiment includes the first pressure release passage 146a routed via the switching valve 350 (in other words, opened and closed by the switching valve 350), and the second pressure release passage 146b routed via the fixed throttle 103c (in other words, the second pressure release passage 146b is always open), as pressure release passages that provide communication between the crank chamber 140 and the suction chamber 141 and allows the refrigerant in the crank chamber 140 to flow out into the suction chamber 141. A minimum passage cross-sectional area of the first pressure release passage 146a is set to be greater than the passage cross-sectional area of the fixed throttle 103c of the second pressure release passage 146b.

Furthermore, in the present embodiment, the pressure supply passage 145a between the control valve 300 and the switching valve 350 is configured to communicate with the suction chamber 141 through a throttle passage 320 (described below) routed via the control valve 300.

Thus, when the control valve 300 opens, and accordingly, the pressure supply passage 145 opens, the discharged refrigerant is supplied to the pressure supply passage 145a between the control valve 300 and the switching valve 350, resulting in an increase in pressure in the pressure supply passage 145a between the control valve 300 and the switching valve 350, whereas, when the control valve 300 is closed, and accordingly, the pressure supply passage 145 is closed, the refrigerant in the pressure supply passage 145a between the control valve 300 and the switching valve 350 flows out through the throttle passage 320 into the suction chamber 141, resulting in a decrease in pressure in the pressure supply passage 145a between the control valve 300 and the switching valve 350.

Then, when the control valve 300 closes the pressure supply passage 145 and the pressure in the pressure supply passage 145a between the control valve 300 and the switching valve 350 becomes lower than the pressure in the crank chamber 140, the switching valve 350 blocks the communication between the first valve hole 104e1 and the second valve hole 151a, and simultaneously, provides communication between the second valve hole 151a and the pressure release hole 351a1 (switching from the first state to the second state). That is, the switching valve 350 closes the pressure supply passage 145, and simultaneously, opens the first pressure release passage 146a. This causes the first pressure release passage 146a and the second pressure release passage 146b constitute the pressure release passage that provides communication between the crank chamber 140 and the suction chamber 141 and allows the refrigerant in the crank chamber 140 to flow out into the suction chamber 141, so that the cross-sectional area of the pressure release passage is maximized. Furthermore, since the communication between the first valve hole 104e1 and the second valve hole 151a is blocked, a backflow of a refrigerant flowing from the crank chamber 140 toward the control valve 300 is prevented. Thus, the refrigerant in the crank chamber 140 rapidly flows out into the suction chamber 141 through the first pressure release passage 146a and the second pressure release passage 146b, so that the pressure in the crank chamber 140 becomes equal to that in the suction chamber 141. Thereby, the inclination angle of the swash plate 111 is maximized, and accordingly, the stroke of the piston 136, that is, the discharge displacement of the variable displacement compressor 100 is maximized.

Then, when the control valve 300 opens the pressure supply passage 145 and the pressure in the pressure supply passage 145a between the control valve 300 and the switching valve 350 becomes higher than the pressure in the crank chamber 140, the switching valve 350 blocks the communication between the second valve hole 151a and the pressure release hole 351a1, and simultaneously, provides communication between the first valve hole 104e1 and the second valve hole 151a (switching from the second state to the first state). That is, the switching valve 350 closes the first pressure release passage 146a, and simultaneously, opens the pressure supply passage 145. Thereby, the pressure release passage is constituted only by the second pressure release passage 146b, so that the passage cross-sectional area of the pressure release passage is minimized. That is, the refrigerant in the crank chamber 140 is restricted from flowing out into the suction chamber 141, so that the pressure in the crank chamber 140 becomes likely to increase. The discharged refrigerant is supplied to the crank chamber 140 through the pressure supply passage 145. Thus, by adjusting the opening degree of the pressure supply passage 145 by the control valve 300, it is possible to change the pressure in the crank chamber 140, whereby it is possible to variably control the inclination angle of the swash plate 111, that is, the stroke (discharge displacement) of the piston 136.

An oil for lubrication is enclosed inside the variable displacement compressor 100, and the inside of the variable displacement compressor 100 is lubricated by stirring an oil by the rotation of the drive shaft 110 or by the movement of the oil due to the movement of the refrigerant gas.

Next, each of the control valve 300, the throttle passage 320, and the switching valve 350 will be described in more detail.

Control Valve 300

Figure 2:
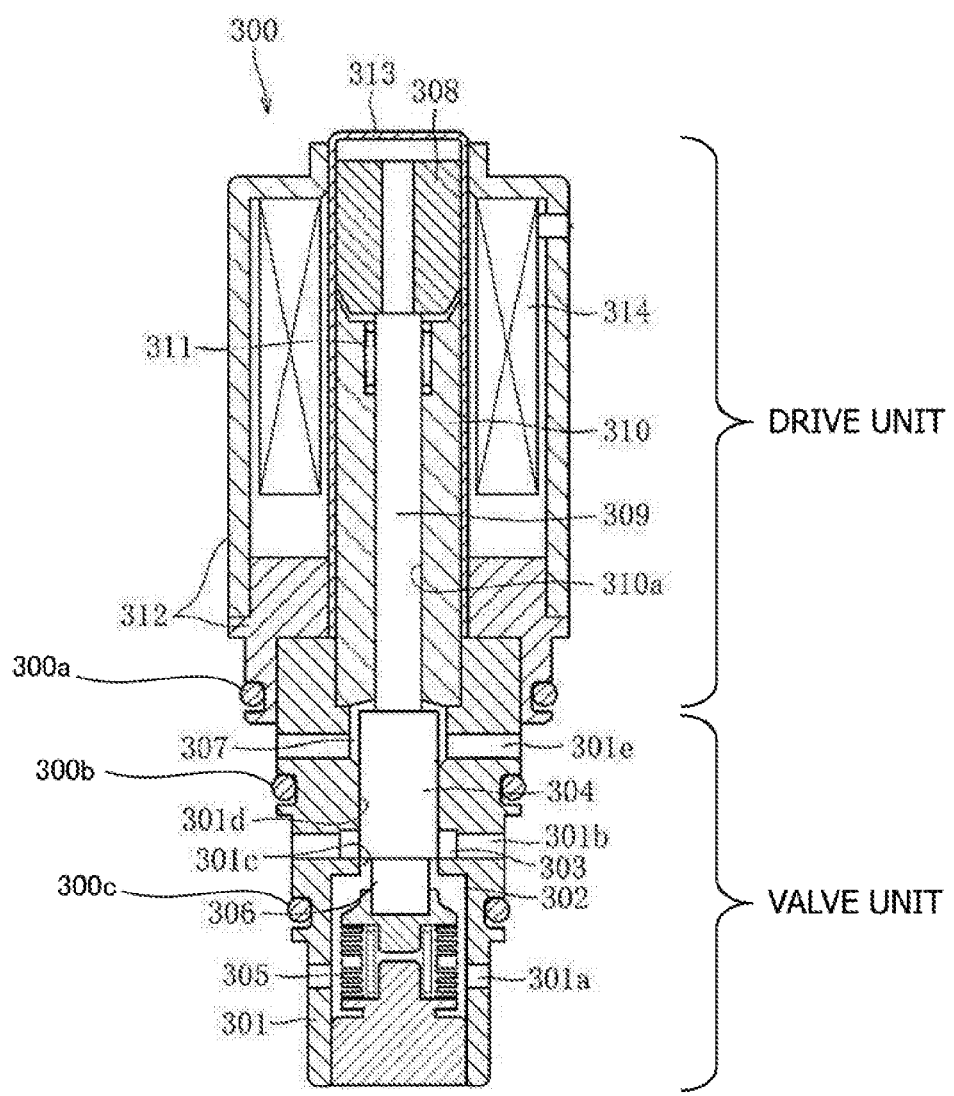
FIG. 2 is a cross-sectional view illustrating a control valve of the variable displacement compressor.
Figure 3:
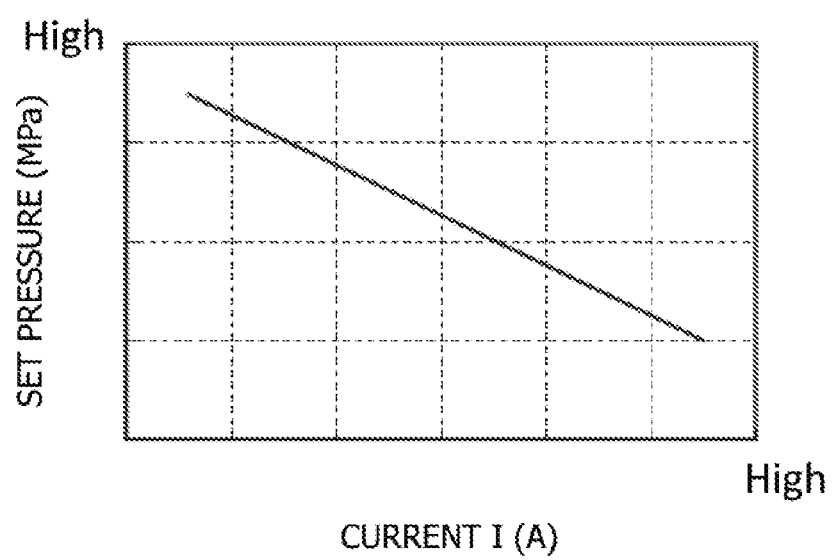
FIG. 3 is a graph illustrating the relationship between a coil power supply amount and a set pressure in the control valve.

FIG. 2 is a cross-sectional view illustrating the control valve 300, and FIG. 3 is a graph illustrating the relationship between the coil power supply amount (current I) and the set pressure. As illustrated in FIG. 2, in the present embodiment, the control valve 300 includes a valve unit and a drive unit (solenoid) that opens and closes the valve unit.

The valve unit has a cylindrical valve housing 301. Inside the valve housing 301, a first pressure sensing chamber 302, a valve chamber 303 and a second pressure sensing chamber 307 are formed, in this order, in the axial direction from one end (lower end) of the valve housing 301.

The first pressure sensing chamber 302 communicates with the crank chamber 140 through a communication hole 301a formed in the outer peripheral surface of the valve housing 301, the third region of the first accommodation chamber 104b, the communication passage 104e, the second accommodation chamber 107, and the communication passage 101d. The second pressure sensing chamber 307 communicates with the suction chamber 141 through a communication hole 301e formed in the outer peripheral surface of the valve housing 301, the first region of the first accommodation chamber 104b, and the communication passage 104f. The valve chamber 303 communicates with the discharge chamber 142 through a communication hole 301b formed in the outer peripheral surface of the valve housing 301, the second region of the first accommodation chamber 104b, and the communication passage 104c. The first pressure sensing chamber 302 and the valve chamber 303 are configured in a manner capable of communicating with each other through a valve hole 301c that constitutes a part of the pressure supply passage 145. A support hole 301d is formed between the valve chamber 303 and the second pressure sensing chamber 307.

In the first pressure sensing chamber 302, a bellows 305 is disposed. The bellows 305 is internally evacuated and incorporates a spring. The bellows 305 is configured to be axially displaceable in the axial direction of the valve housing 301, and has a function as a pressure sensing means for receiving the pressure in the first pressure sensing chamber 302, that is, the pressure in the crank chamber 140.

In the valve chamber 303, a cylindrical valve body 304 is accommodated. The valve body 304 is configured so that its outer peripheral surface is in close contact with the inner peripheral surface of the support hole 301d, and the valve body 304 is slidable in the support hole 301d. The valve body 304 is movable in the axial direction of the valve housing 301. One end (lower end) of the valve body 304 opens and closes the valve hole 301c, and the other end (upper end) of the valve body 304 projects into the second pressure sensing chamber 307.

At the one end of the valve body 304, a rod-like connection portion 306 is formed to protrude. An end (tip) of the connection portion 306 is disposed in a manner capable of contacting the bellows 305, and has a function of transmitting a displacement of the bellows 305 to the valve body 304.

The drive unit includes a cylindrical solenoid housing 312. The solenoid housing 312 is coaxially connected to the other end (upper end) of the valve housing 301. In the solenoid housing 312, a molded coil 314 in which an electromagnetic coil is covered with resin is accommodated. In the solenoid housing 312, a cylindrical fixed core 310 concentric with the molded coil 314 is accommodated inside the molded coil 314. The fixed core 310 extends from the valve housing 301 to near the center of the molded coil 314. An end of the solenoid housing 312 opposite to the valve housing 301 is closed by a cylindrical sleeve 313 having a bottom, the sleeve 313 being provided so as to surround the fixed core 310.

The fixed core 310 has an insertion hole 310a at the center thereof. One end (lower end) of the insertion hole 310a is open to the second pressure sensing chamber 307. Between the fixed core 310 and the closed end (bottom) of the sleeve 313, a cylindrical movable core 308 is accommodated.

A solenoid rod 309 is inserted through the insertion hole 310a. One end (lower end) of the solenoid rod 309 is secured to the other end of the valve body 304 by press-fitting. The other end (upper end) of the solenoid rod 309 is fitted (press-fitted) into a through hole formed in the movable core 308. That is, the valve body 304, the movable core 308, and the solenoid rod 309 are integrated. Furthermore, between the fixed core 310 and the movable core 308, there is provided a forced release spring 311 that urges the movable core 308 in a direction departing from the fixed core 310 (valve opening direction).

The movable core 308, the fixed core 310 and the solenoid housing 312 are made of a magnetic material to constitute a magnetic circuit. On the other hand, the sleeve 313 is made of a non-magnetic stainless-steel material.

The molded coil 314 is connected to a control device (not illustrated) provided outside the variable displacement compressor 100 via a signal line or the like. When control current I is supplied from the control device, the molded coil 314 generates electromagnetic force F(I). When the molded coil 314 generates electromagnetic force F(I), the movable core 308 is attracted toward the fixed core 310, so that the valve body 304 moves to the valve closing direction.

On the valve body 304 of the control valve 300, there acts, in addition to electromagnetic force F(I) generated by the molded coil 314, biasing force f generated by the forced release spring 311, a force generated by the pressure in the valve chamber 303 (discharge pressure Pd), a force generated by the pressure in the first pressure sensing chamber 302 (crank chamber pressure Pc), a force generated by the pressure in the second pressure sensing chamber 307 (suction pressure Ps), and biasing force F generated by a built-in spring of the bellows 305. Here, since the relationship of effective pressure receiving area Sb of the bellows 305, sealing area Sv, which is the area of the valve hole 301c blocked by the valve body 304, and cross-sectional area Sr of the cylindrical outer peripheral surface of the valve body 304, establish Sb=Sv=Sr, a balance among forces acting on the valve body 304 is represented by the following equation (1), and by deforming the following equation (1), the following equation (2) is obtained. In the equations (1) and (2), "+" indicates the valve closing direction of the valve body 304, and "−" indicates the valve opening direction of the valve body 304.

$$F(I)-f+Ps\cdot Sb-F=0 \tag{1}$$

$$Ps=(F+f-F(I))/Sb \tag{2}$$

When the pressure in the suction chamber 141 becomes higher than a set pressure that is set in accordance with the current flowing through the molded coil 314 (i.e., control current I), a coupled body of the bellows 305, the connection portion 306 and the valve body 304 decreases the opening degree of the valve hole 301c, that is, the opening degree of the pressure supply passage 145 (passage cross-sectional area), to thereby decrease the pressure in the crank chamber 140, in order to increase the discharge displacement. When the pressure in the suction chamber 141 falls below the set pressure, the coupled body increases the opening degree of the pressure supply passage 145 (passage cross-sectional area), to thereby increase the pressure in the crank chamber 140, in order to decrease the discharge displacement. That is, the control valve 300 autonomously controls the opening degree (passage cross-sectional area) of the pressure supply passage 145 so that the pressure in the suction chamber 141 approaches the set pressure.

The electromagnetic force of the molded coil 314 acts on the valve body 304 via the solenoid rod 309 in the valve closing direction, and accordingly, when a power supply amount to the molded coil 314 increases, a force in a direction of decreasing the opening degree of the pressure supply passage 145 increases, and as illustrated in FIG. 3, the set pressure changes in a decreasing direction. The control device controls such power supply to the molded coil 314 by pulse width modulation (PWM control) at a predetermined frequency, for example, in a range of 400 Hz to 500 Hz, and changes a pulse width (duty ratio) so that a value of a current flowing through the molded coil 314 reaches a desired value.

When the air conditioning system is in operation, that is, when the variable displacement compressor 100 is in an operating state, the control device adjusts the power supply amount to the molded coil 314 based on air conditioning setting (set temperature, etc.) of the air conditioning system and on an external environment. This controls the discharge displacement so that the pressure in the suction chamber 141 becomes the set pressure corresponding to the power supply amount. On the other hand, when the air conditioning system is not in operation, that is, the variable displacement compressor 100 is in an inactive state, the control device turns off the power supply to the molded coil 314. This makes the forced release spring 311 open the pressure supply passage 145 (valve hole 301c), and accordingly, the discharge displacement of the variable displacement compressor 100 is controlled to a minimum state.

Throttle Passage 320

Figure 4:
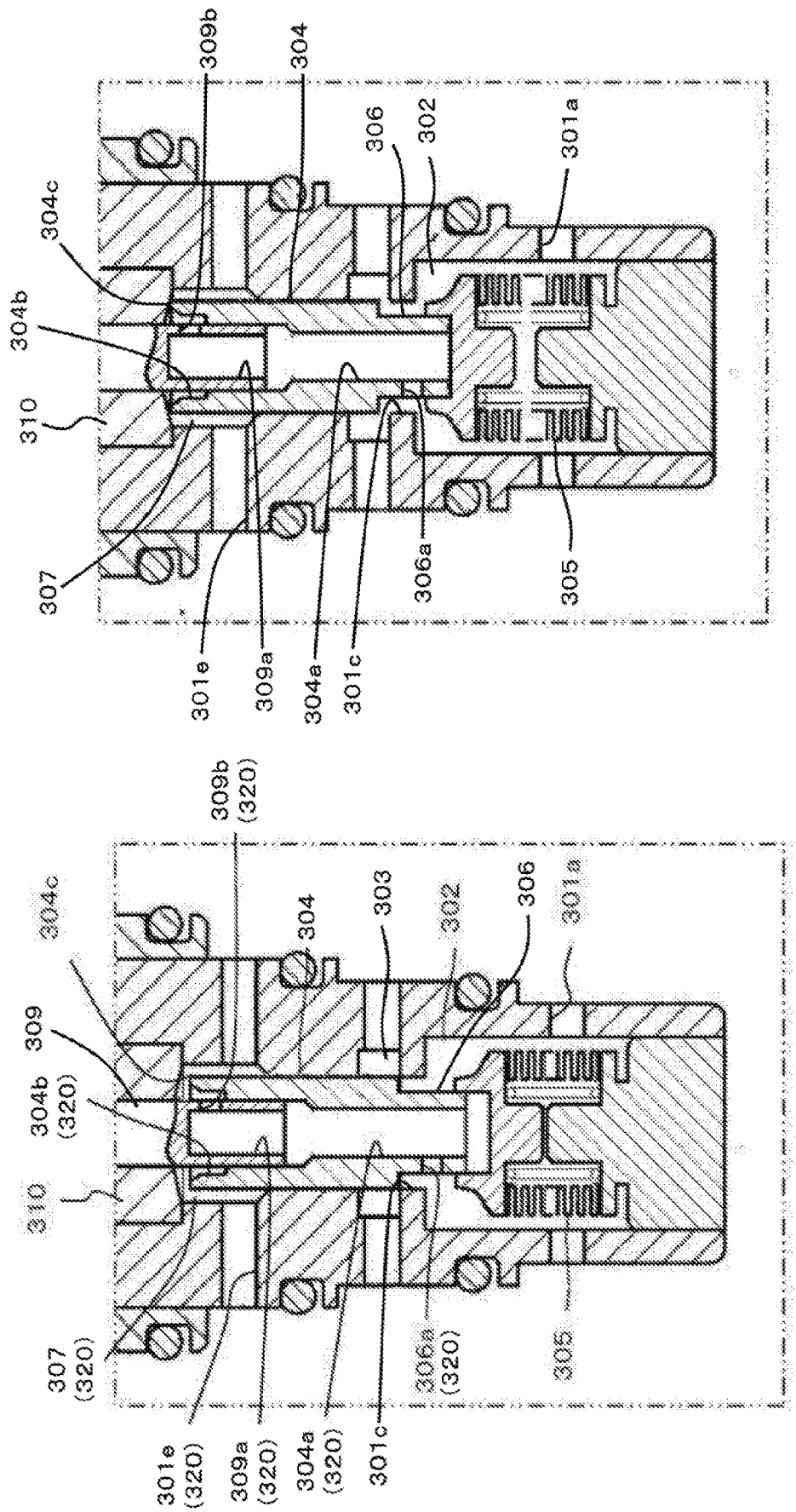

In the present embodiment, the throttle passage 320 is provided inside the control valve 300, and is configured to provide communication between the pressure supply passage 145a between the control valve 300 and the switching valve 350, and the suction chamber 141. FIGS. 4A and 4B are cross-sectional views of the main part of the control valve 300. FIG. 4A illustrates a state in which the throttle passage 320 is open, and FIG. 4B illustrates a state in which the throttle passage 320 is closed.

The throttle passage 320 is provided to allow the refrigerant in the pressure supply passage 145a between the control valve 300 and the switching valve 350 to escape to the suction chamber 141, when the control valve 300 is closed and the pressure supply passage 145 is closed.

In the present embodiment, as illustrated in FIG. 4A, the throttle passage 320 is constituted by: a communication hole 304a defining an internal space of the integrated valve body 304 and connection portion 306; a communication hole 306a formed in the connection portion 306, the communication hole 306a providing communication between the first pressure sensing chamber 302 and a communication hole 304a; a communication hole 309a formed inside the press-fit portion of the solenoid rod 309 pressed into the valve body 304, the communication hole 309a being connected to the communication hole 304a; a cylindrical recess 304b formed at the other end (upper end) of the valve body 304; a communication hole 309b formed at a portion of the solenoid rod 309 located in the recess 304b and providing communication between the communication hole 309a and the inside of the recess 304b; the second pressure sensing chamber 307; the communication hole 301e formed in the outer peripheral surface of the valve housing 301; and a communication passage 104f (see FIG. 1) formed in the cylinder head 104.

Thus, as illustrated in FIG. 4B, when a surface 304c on the other end of the valve body 304 (i.e., an annular surface surrounding the recess 304b) comes into contact with a lower end surface of the fixed core 310, the throttle passage 320 is closed, so that the communication between the first pressure sensing chamber 302 communicating with the pressure supply passage 145a between the control valve 300 and the switching valve 350, and the suction chamber 141, is blocked.

On the other hand, as illustrated in FIG. 4A, when the surface (annular surface) 304c on the other end of the valve body 304 departs from the lower end surface of the fixed core 310, the throttle passage 320 opens, so that the first pressure sensing chamber 302 and the suction chamber 141 communicate through the throttle passage 320. The communication hole 309b formed in the solenoid rod 309 is formed to function as a "throttle portion" when the throttle passage 320 opens. The opening area of the communication hole 309b is set to be as small as possible in consideration of the outflow (discharge) property of the refrigerant into the suction chamber 141 in the region of the pressure supply passage 145a between the control valve 300 and the switching valve 350. The throttle portion may be provided in the communication hole 306a, the communication hole 304a, or the communication hole 309a.

In the control valve 300, when the molded coil 314 is demagnetized, the one end of the valve body 304 departs from the periphery of the valve hole 301c by the biasing force of the forced release spring 311, and the valve opening degree is maximized. That is, the pressure supply passage 145 opens to a maximum. At this time, as illustrated in FIG. 4B, the surface 304c on the other end of the valve body 304 comes into contact with the lower end surface of the fixed core 310, so that the throttle passage 320 is closed. On the other hand, when a current value which causes an electromagnetic force exceeding the biasing force of the forced release spring 311 to act, flows through the molded coil 314, the one end of the valve body 304 moves in a direction closing the valve hole 301c, and accordingly, as illustrated in FIG. 4A, the surface 304c on the other end of the valve body 304 departs from the lower end surface of the fixed core 310, so that the throttle passage 320 opens.

Thus, in the present embodiment, the surface 304c on the other end of the valve body 304 and the fixed core 310 (or the lower end surface thereof) of the control valve 300 constitute valve means (valve mechanism) for opening and closing the throttle passage 320. The throttle passage 320 is closed only when the variable displacement compressor 100 is in an inactive (turned-off) state in which the molded coil 314 is demagnetized, whereas when the variable displacement compressor 100 is in an activated (turned-on) state in which the molded coil 314 is excited, the throttle passage 320 is open (in an opening state), to provide communication between the pressure supply passage 145a between the control valve 300 and the switching valve 350, and the suction chamber 141.

Switching Valve 350

FIG. 5 is a cross-sectional view illustrating the switching valve 350 according to the first embodiment. As described above, the switching valve 350 is disposed in the second accommodation chamber 107 constituted by the cylinder head-side recess 104d and the cylinder block-side recess 101c. The switching valve 350 includes: a partition member 351 secured in the cylinder head-side recess 104d; a main valve body 352 accommodated in the cylinder head-side recess 104d, and being adapted to axially move in the cylinder head-side recess 104d; and a sub valve body 400 accommodated in the cylinder block-side recess 101c and being adapted to axially move in the cylinder block-side recess 101c. In the present embodiment, the sub valve body 400 is formed to be lighter than the main valve body 352. Specifically, in the present embodiment, the main valve body 352 (and the partition member 351) is made of a metal material, such as an aluminum-based metal or a brass-based metal, and the sub valve body 400 is made of a resin material.

The cylinder head-side recess 104d is formed as a stepped cylindrical recess parallel to the axis of the drive shaft 110. Specifically, the cylinder head-side recess 104d is constituted by a larger inner diameter portion 104d1 on the side of the connecting surface facing the cylinder block 101, and a smaller inner diameter portion 104d2 being continuous with the larger inner diameter portion 104d1 and having a smaller diameter than that of the larger inner diameter portion 104d1. At the inner peripheral surface of the larger inner diameter portion 104d1, the other end of the communication passage 104g having one end thereof open to the suction chamber 141, is open.

The cylinder block-side recess 101c is parallel to the axis of the drive shaft 110, and is formed as a cylindrical recess having a diameter smaller than that of the cylinder head-side recess 104d. One end of the communication passage 101d that constitutes the pressure supply passage 145b between the switching valve 350 and the crank chamber 140 is open at a bottom surface 101c1 of the cylinder block-side recess 101c.

The partition member 351 has a cylindrical peripheral wall 351a and an end wall 351b that closes one end of the peripheral wall 351a. By having the peripheral wall 351a press-fitted in and secured to the inner peripheral surface of the larger inner diameter portion 104d1 of the cylinder head-side recess 104d, the partition member 351 partitions the cylinder head-side recess 104d into a first valve chamber 104d3 principally formed of the smaller inner diameter portion 104d2, and a second valve chamber 104d4 formed inside the peripheral wall 351a and located on a side of the discharge valve forming plate 151. The other end (open end) 351a2 of the peripheral wall 351a contacts the discharge valve forming plate 151.

In the end wall 351b of the partition member 351, an insertion hole 351b1 is formed. Through the insertion hole 351b1, the first valve chamber 104d3 and the second valve chamber 104d4 communicate. On a surface of the end wall 351b of the partition member 351, opposite to the peripheral wall 351a, there is formed an annular protruding portion 351b2 surrounding the insertion hole 351b1 and protruding toward the first valve chamber 104d3.

The bottom surface 104d5 of the cylinder head-side recess 104d (or the smaller inner diameter portion 104d2 thereof) constitutes an inner wall of the first valve chamber 104d3. At the bottom surface 104d5 of the cylinder head-side recess 104d, one end of the communication passage 104e that constitutes the pressure supply passage 145a between the control valve 300 and the switching valve 350 is open, serving as the first valve hole 104e1. A surrounding portion of the first valve hole 104e1 on the bottom surface 104d5 of the cylinder head-side recess 104d constitutes a first valve seat 104e2. That is, the first valve chamber 104d3 has: the first valve hole 104e1 communicating with the pressure supply passage 145a between the control valve 300 and the switching valve 350 (i.e., the discharge chamber 142); and the first valve seat 104e2 surrounding the first valve hole 104e1.

The discharge valve forming plate 151 constitutes an inner wall of the second valve chamber 104d4. Through the discharge valve forming plate 151, the second valve hole 151a is open. The surrounding portion of the second valve hole 151a on the discharge valve forming plate 151 constitutes a second valve seat 151b. The second valve hole 151a communicates with the communication passage 101d constituting the pressure supply passage 145b between the switching valve 350 and the crank chamber 140, through the communication hole penetrating through the valve plate 103 and the suction valve forming plate 150 and through the cylinder block-side recess 101c. In the peripheral wall 351a of the partition member 351 in which the second valve chamber 104d4 is formed thereinside, there is formed the pressure release hole 351a1 communicating with the suction chamber 141 through the communication passage 104g. That is, the second valve chamber 104d4 has: the second valve hole 151a communicating with the pressure supply passage 145b between the switching valve 350 and the crank chamber 140 (i.e., communicating with the crank chamber 140); the second valve seat 151b surrounding the second valve hole 151a; and the pressure release hole 351a1 communicating with the suction chamber 141.

The main valve body 352 includes: a first valve portion 352a disposed in the first valve chamber 104d3 and adapted to contact and depart from the first valve seat 104e2 surrounding the first valve hole 104e1; a second valve portion 352b disposed in the second valve chamber 104d4 and adapted to contact and depart from the second valve seat 151b surrounding the second valve hole 151a; and a stem portion 352c that connects the first valve portion 352a and the second valve portion 352b, and inserted through the insertion hole 351b1 formed in the partition member 351. Then, in the present embodiment, it is configured so that, by having one end surface 352a1 of the first valve portion 352a contact and depart from the first valve seat 104e2, the first valve hole 104e1 is opened and closed, and by having one end surface 352b1 of the second valve portion 352b contact and depart from the second valve seat 151b, the second valve hole 151a and the pressure release hole 351a1 communicate with each other, or the communication between the second valve hole 151a and the pressure release hole 351a1 is blocked.

In the present embodiment, the first valve portion 352a and the stem portion 352c of the main valve body 352 are integrally formed, and the second valve portion 352b of the main valve body 352 is separately formed from the first valve portion 352a and the stem portion 352c, and is secured to the stem portion 352c. Specifically, the main valve body 352 is formed by press-fitting the stem portion 352c integrally formed with the first valve portion 352a, into a through hole formed through the second valve portion 352b. The press-fit position of the stem portion 352c in the axial direction thereof with respect to the through hole of the second valve portion 352b is adjusted when the main valve body 352 is formed, in a manner such that when the one end surface 352b1 of the second valve portion 352b contacts the second valve seat 151b, the other end surface 352a2 of the first valve portion 352a simultaneously contacts the annular protruding portion 351b2 formed on the end wall 351b of the partition member 351.

Furthermore, in the present embodiment, the partition member 351 and the main valve body 352 are integrated to constitute a valve assembly 350a. Hereinbelow, an assembly method (assembly processes) of the valve assembly 350a will be described with reference to FIG. 6.

First, the one end surface 352b1 of the second valve portion 352b is placed on a horizontal surface H. Next, the open end 351a2 of the peripheral wall 351a of the partition member 351 is placed on the horizontal surface H so that the second valve portion 352b is accommodated thereinside.

Next, an integrally formed component of the first valve portion 352a and the stem portion 352c is inserted from the stem portion 352c side through the insertion hole 351b1 formed through the end wall 351b of the partition member 351. Next, the tip of the stem portion 352c is aligned with the through hole of the second valve portion 352b, and the integrally formed component is pressed so that the stem portion 352c is press-fitted into the through hole of the second valve portion 352b until the other end surface 352a2 of the first valve portion 352a comes into contact with the annular protruding portion 351b2 of the partition member 351. In this way, the valve assembly 350a including the partition member 351 and the main valve body 352 is prepared. Then, in the present embodiment, the valve assembly 350a assembled in this way is mounted in the cylinder head-side recess 104d.

Figure 6:
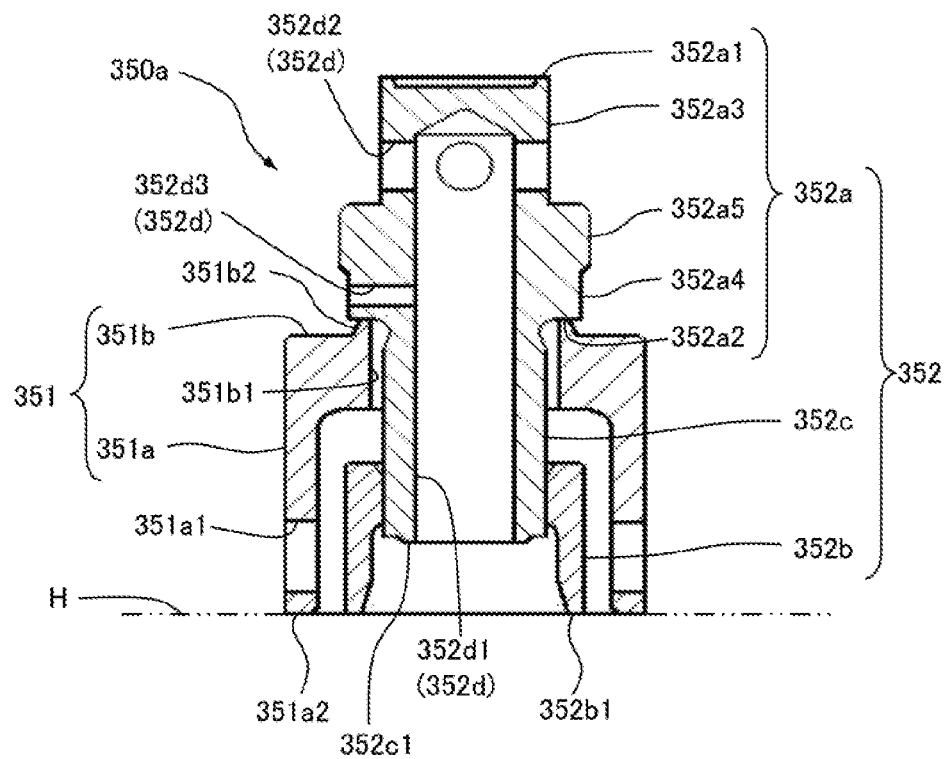
FIG. 6 is a view illustrating a valve assembly of the switching valve (main valve body and partition member).

The configuration of the main valve body 352 will be further described with reference to FIGS. 5 and 6. In the present embodiment, the first valve portion 352a of the main valve body 352 includes: a valve seat-side portion 352a3 on the first valve seat 104e2 side; a partition member-side portion 352a4 on the partition member 351 side; and an intermediate portion 352a5 located between the valve seat-side portion 352a3 and the partition member-side portion 352a4. The outer diameter of the intermediate portion 352a5 is greater than that of the valve seat-side portion 352a3 and that of the partition member-side portion 352a4. The main valve body 352 is supported so that a predetermined clearance is formed between the outer peripheral surface of the intermediate portion 352a5 and the inner peripheral surface of the first valve chamber 104d3 (smaller inner diameter portion 104d2 of the cylinder head-side recess 104d).

The second valve portion 352b of the main valve body 352 is formed in a cylindrical shape with a bottom. Through the bottom wall of the second valve portion 352b, there is formed the through hole through which the stem portion 352c extending from the end face of the first valve portion 352a (or the partition member-side portion 352a4 thereof) is press-fitted. An annular open end face of the second valve portion 352b constitutes the one end face 352b1 that contacts and departs from the second valve seat 151b.

Furthermore, the main valve body 352 has an internal passage 352d for providing communication between the first valve hole 104e1 and the second valve hole 151a. The internal passage 352d includes a first passage 352d1 extending in the axial direction of the main valve body 352, and a second passage 352d2 connected to the first passage 352d1. One end of the first passage 352d1 is open to an end surface (tip face) 352c1 of the stem portion 352c press-fitted into the through hole of the second valve portion 352b, and the other end of the first passage 352d1 is a closed end. The second passage 352d2 is formed in the valve seat-side portion 352a3 of the first valve portion 352a, and provides communication between the first passage 352d1 with the first valve chamber 104d3.

Thus, in the switching valve 350 according to the present embodiment, when the one end surface 352a1 of the first valve portion 352a of the main valve body 352 departs from the first valve seat 104e2, and the one end surface 352b1 of the second valve portion 352b comes into contact with the second valve seat 151b, the communication between the second valve hole 151a and the pressure release hole 351a1 is blocked, and simultaneously, the first valve hole 104e1 and the second valve hole 151a communicate through the internal passage 352d (352d1+352d2). On the other hand, when the one end surface 352a1 of the first valve portion 352a comes into contact with the first valve seat 104e2 and accordingly the first valve hole 104e1 is closed, the communication between the first valve hole 104e1 and the second valve hole 151a through the internal passage 352d is blocked, and simultaneously, the one end surface 352b1 of the second valve portion 352b departs from the second valve seat 151b and accordingly the second valve hole 151a and the pressure release hole 351a1 communicate.

Here, as described above, when the one end surface 352b1 of the second valve portion 352b comes into contact with the second valve seat 151b, the other end surface 352a2 of the first valve portion 352a contacts the annular protruding portion 351b2 of the partition member 351. Thus, the communication between the first valve chamber 104d3 and the second valve chamber 104d4 through the insertion hole 351b1 is blocked. That is, the refrigerant is prevented from flowing from the first valve chamber 104d3 to the second valve chamber 104d4 via the insertion hole 351b1. Furthermore, since the other end surface 352a2 of the first valve portion 352a contacts the annular protruding portion 351b2 of the partition member 351, it is possible to reduce the contact area between the other end surface 352a2 of the first valve portion 352a and the partition member 351. Thus, it is possible to reduce an increase in additional force, such as a sticking force by an oil acting on the main valve body 352. This facilitates the movement of the main valve body 352 from a state in which the main valve body 352 contacts the second valve seat 151b in a direction contacting the first valve seat 104e2.

Furthermore, in the present embodiment, the internal passage 352d of the main valve body 352 further includes a third passage 352d3 formed in the partition member-side portion 352a4 of the first valve portion 352a, and providing communication between the first passage 352d1 and the first valve chamber 104d3. Thus, even when the other end surface 352a2 of the first valve portion 352a is in contact with the annular protruding portion 351b2 of the partition member 351, a flow of refrigerant can be formed in a clearance between the outer peripheral surface of the intermediate portion 352a5 of the first valve portion 352a and the inner peripheral surface of the first valve chamber 104d3. Thus, even if foreign matter or the like is contained in the refrigerant flowing from the first valve hole 104e1 into the first valve chamber 104d3, the flow of refrigerant can prevent such foreign matter or the like from remaining in the clearance between the outer peripheral surface of the intermediate portion 352a5 of the first valve portion 352a and the inner peripheral surface of the first valve chamber 104d3, and from inhibiting the movement of the main valve body 352.

Figure 7:
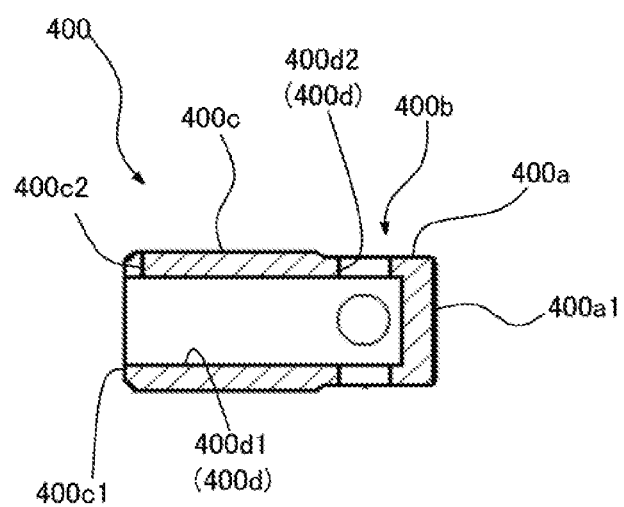
FIG. 7 is a cross-sectional view illustrating a configuration of a sub valve body of the switching valve.

FIG. 7 is a cross-sectional view illustrating the configuration of the sub valve body 400. The sub valve body 400 includes: a smaller outer diameter portion 400b disposed on the main valve body 352 side and including a valve portion 400a adapted to contact and depart from the end surface 352c1 of the stem portion 352c of the main valve body 352; and a larger outer diameter portion 400c disposed on the bottom surface 101c1 side of the cylinder block-side recess 401k and having a larger outer diameter than that of the smaller outer diameter portion 400b.

The sub valve body 400 is supported in a manner such that a predetermined clearance is formed between the larger outer diameter portion 400c and the inner peripheral surface of the cylinder block-side recess 101c. The smaller outer diameter portion 400b projects into the second valve hole 151a through the communication hole penetrating the valve plate 103 and the suction valve forming plate 150 (see FIG. 5). By having the end surface 400a1 of the valve portion 400a of the sub valve body 400 contact and depart from the end surface 352c1 of the stem portion 352c of the main valve body 352, an end portion of the internal passage 352d of the main valve body 352 on the second valve hole 151a side, or specifically the one end (open end) of the first passage 352d1 that is open to the end surface 352c1 of the stem portion 352c, is opened and closed.

Furthermore, the sub valve body 400 has an internal passage (sub valve body internal passage) 400d. The sub valve body internal passage 400d includes a first passage 400d1 extending in the axial direction of the sub valve body 400, and a second passage 400d2 connected to the first passage 400d1. One end of the first passage 400d1 is open to an end surface 400c1 of the larger outer diameter portion 400c facing the bottom surface 101c1 of the cylinder block-side recess 101c, and the other end of the first passage 400d1 is a closed end. The second passage 400d2 is formed to penetrate the smaller outer diameter portion 400b in the radial direction, and provides connection between the first passage 400d1 and the communication hole that penetrates the valve plate 103 and the suction valve forming plate 150. That is, the internal passage 400d provides communication between the communication passage 101d that constitutes the pressure supply passage 145b between the switching valve 350 and the crank chamber 140, and the second valve hole 151a.

Furthermore, in the sub valve body 400, a communication groove 400c2 extending from the first passage 400d1 to the outer peripheral surface of the larger outer diameter portion 400c is formed in the end surface 400c1 of the larger outer diameter portion 400c. Thus, even when the end surface 400c1 of the larger outer diameter portion 400c is in contact with the bottom surface 101c1 of the cylinder block-side recess 101c, a flow of refrigerant can be formed in a clearance between the outer peripheral surface of the larger outer diameter portion 400c and the inner peripheral surface of the cylinder block-side recess 101c. Even if foreign matter or the like is contained in the refrigerant that has flowed into the cylinder block-side recess 101c, it is possible to prevent the foreign matter or the like from remaining in the clearance between the outer peripheral surface of the larger outer diameter portion 400c and the inner peripheral surface of the cylinder block-side recess 101c, and from inhibiting the movement of the sub valve body 400.

Operation of Switching Valve 350

Figure 8A:
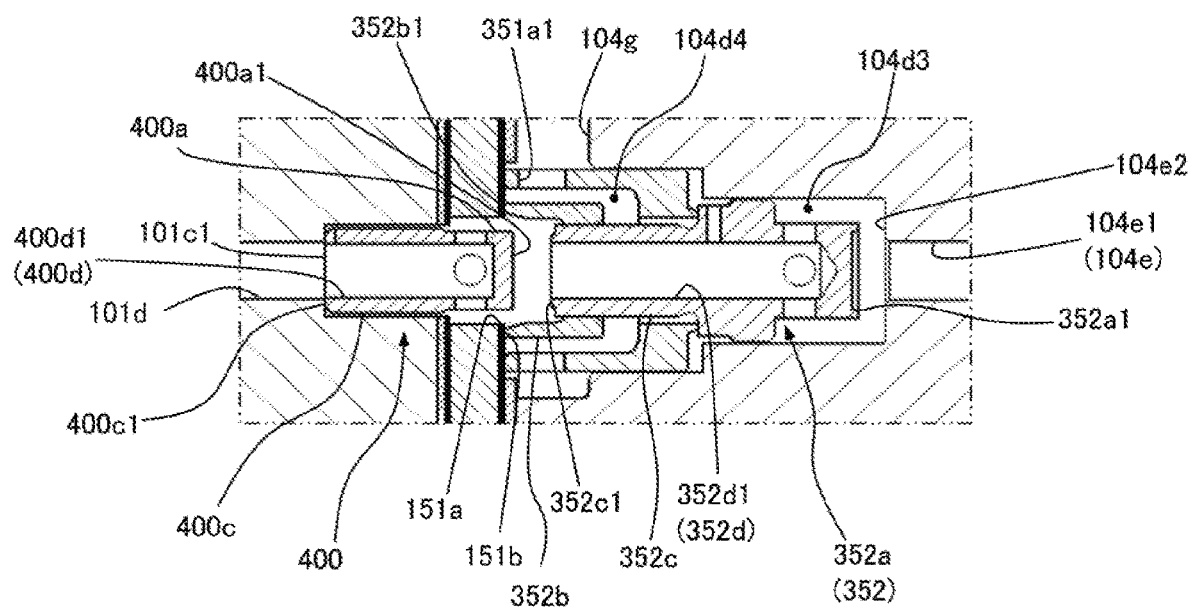
Figure 8B:
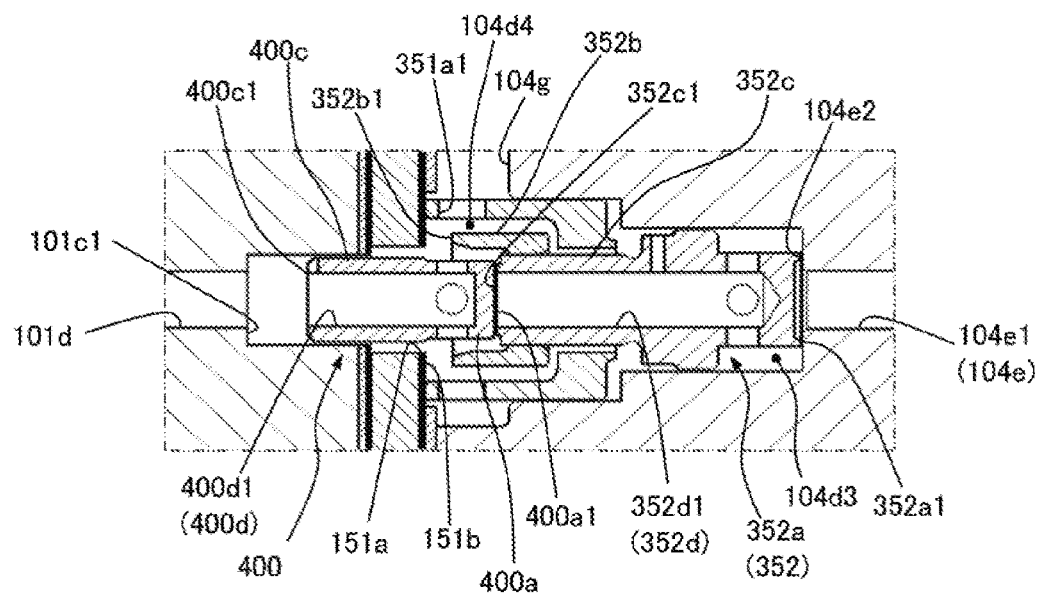

The operation of the switching valve 350 will be described with reference to FIGS. 8A and 8B. One end of the main valve body 352 receives pressure Pm in the pressure supply passage 145a between the control valve 300 and the switching valve 350, and the other end side of the main valve body 352 receives pressure Ps in the pressure supply passage 145b between the switching valve 350 and the crank chamber 140 (i.e., the pressure in the crank chamber 140). When the first valve portion 352a of the main valve body 352 opens the first valve hole 104e1, one end of the sub valve body 400 receives pressure Pm in the pressure supply passage 145a between the control valve 300 and the switching valve 350, and the other end of the sub valve body 400 receives pressure Pc in the pressure supply passage 145b between the switching valve 350 and the crank chamber 140.

Thus, when pressure Pm in the pressure supply passage 145a between the control valve 300 and the switching valve 350 is higher than pressure Pc in the crank chamber 140, the main valve body 352 has the one end surface 352a1 of the first valve portion 352a depart from the first valve seat 104e2, and has the one end surface 352b1 of the second valve portion 352b contacts (seats) the second valve seat 151b. Furthermore, the sub valve body 400 has the end surface 400a1 of the valve portion 400a depart from the end surface 352c1 of the stem portion 352c of the main valve body 352, and has the end surface 400c1 of the larger outer diameter portion 400c contacts the bottom surface 101c1 of the cylinder block-side recess 101c. (See FIG. 8A). In this case, the first valve hole 104e1 and the second valve hole 151a communicate through the internal passage 352d of the main valve body 352, and the communication between the second valve hole 151a and the pressure release hole 351a1 is blocked. That is, the communication passage 104e constituting the pressure supply passage 145a between the control valve 300 and the switching valve 350, and the communication passage 101d constituting the pressure supply passage 145b between the switching valve 350 and the crank chamber 140, communicate through the first valve hole 104e1, the internal passage 352d of the main valve member 352, the second valve hole 151a, and the internal passage 400d of the sub valve body 400. That is, the switching valve 350 opens the pressure supply passage 145 and simultaneously closes the first pressure release passage 146a.

On the other hand, when pressure Pm in the pressure supply passage 145a between the control valve 300 and the switching valve 350 is lower than pressure Pc in the crank chamber 140, the main valve body 352 has the one end surface 352a1 of the first valve portion 352a contacts (seats) the first valve seat 104e2, and simultaneously has the one end surface 352b1 of the second valve portion 352b depart from the second valve seat 151b. Furthermore, the sub valve body 400 has the end surface 400a1 of the valve portion 400a contact the end surface 352c1 of the stem portion 352c of the main valve body 352 and simultaneously has the end surface 400c1 of the larger outer diameter portion 400c depart from the bottom surface 101c1 of the cylinder block-side recess 101c (see FIG. 8B). In this case, the communication between the first valve hole 104e1 and the second valve hole 151a is blocked, and simultaneously the second valve hole 151a and the pressure release hole 351a1 communicate. That is, the communication passage 101d that constitutes the pressure supply passage 145b between the switching valve 350 and the crank chamber 140 communicates with the suction chamber 141 through the internal passage 400d of the sub valve body 400, the second valve chamber 104d4, the pressure release hole 351a1, and the communication passage 104g. That is, the switching valve 350 closes the pressure supply passage 145 and simultaneously opens the first pressure release passage 146a.

Here, when the control valve 300 opens the pressure supply passage 145, the discharged refrigerant is supplied to the pressure supply passage 145a between the control valve 300 and the switching valve 350. This increases pressure Pm in the pressure supply passage 145a between the control valve 300 and the switching valve 350 to be higher than pressure Pc in the crank chamber 140. On the other hand, when the control valve 300 closes the pressure supply passage 145, the refrigerant in the pressure supply passage 145a between the control valve 300 and the switching valve 350 flows into the suction chamber 141 via the throttle passage 320. This reduces pressure Pm in the pressure supply passage 145a between the control valve 300 and the switching valve 350 to be lower than pressure Pc in the crank chamber 140.

Thus, when the control valve 300 is open, the switching valve 350 provides communication between the pressure supply passage 145a between the control valve 300 and the switching valve 350 and the pressure supply passage 145b between the switching valve 350 and the crank chamber 140, to allow the discharged refrigerant to be supplied to the crank chamber 140, and to minimize the cross-sectional area of the pressure release passage. When the control valve 300 is closed, the switching valve 350 causes the pressure supply passage 145b between the switching valve 350 and the crank chamber 140 to function as the first pressure release passage 146a to maximize the passage cross-sectional area of the pressure release passage, to enable the refrigerant in the crank chamber 140 to rapidly flow out into the suction chamber 141, and to prevent the refrigerant from flowing from the crank chamber 140 to the control valve 300.

Operation of Variable Displacement Compressor 100

FIG. 9 illustrates a state in which the variable displacement compressor 100 is stopped, while the engine of the vehicle is stopped, or the like. When the variable displacement compressor 100 is stopped, power supply to the molded coil 314 of the control valve 300 is turned off, and the control valve 300 opens the pressure supply passage 145 to a maximum (the passage cross-sectional area is maximized). Furthermore, the throttle passage 320 is closed. In the switching valve 350, the one end surface 352b1 of the second valve portion 352b of the main valve body 352 contacts the second valve seat 151b, so that the communication between the second valve hole 151a and the pressure release hole 351a1 is blocked, and the one end surface 352a1 of the first valve portion 352a of the main valve body 352 departs from the first valve seat 104e2. In the sub valve body 400, the end surface 400c1 of the larger outer diameter portion 400c contacts the bottom surface 101c1 of the cylinder block-side recess 101c, and simultaneously, the end surface 400a1 of the valve portion 400a departs from the end surface 352c1 of the stem portion 352c of the main valve body 352 (the internal passage 352d of the main valve body 352 is open). Thus, the pressure supply passage 145a between the control valve 300 and the switching valve 350 communicates with the pressure supply passage 145b between the switching valve 350 and the crank chamber 140. The crank chamber 140 and the suction chamber 141 communicate only through the second pressure release passage 146b, and the opening degree (passage cross-sectional area) of the pressure release passage providing communication between the crank chamber 140 and the suction chamber 141 is minimized.

When the engine of the vehicle starts up in a state illustrated in FIG. 9, and the drive shaft 110 of the variable displacement compressor 100 rotates, all the refrigerant (discharged refrigerant) compressed in the compression unit and discharged to the discharge chamber 142 is supplied to the crank chamber 140 via the pressure supply passage 145, since the discharge check valve 200 closes the discharge passage and the throttle passage 320 is closed. Thus, the pressure in the crank chamber 140 rapidly increases, the inclination angle of the swash plate 111 is minimized, and the stroke (discharge displacement) of the piston 136 is minimized. At this time, the variable displacement compressor 100 is operated in an inactive state. The discharged refrigerant contains an oil, and circulates through an internal circulation passage constituted by the discharge chamber 142, the pressure supply passage 145, the crank chamber 140, the second pressure release passage 146b, the suction chamber 141 and the cylinder bore 101a, to lubricate inside the variable displacement compressor 100.

Then, when the air conditioning system is activated, a current flows in the molded coil 314 of the control valve 300, so that the valve body 304 closes the valve hole 301c. That is, the control valve 300 closes the pressure supply passage 145. At the same time, the throttle passage 320 opens. In this case, the discharged refrigerant is not supplied to the pressure supply passage 145a between the control valve 300 and the switching valve 350, and the refrigerant in the pressure supply passage 145a between the control valve 300 and the switching valve 350 flows out into the suction chamber 141 via the throttle passage 320. This reduces pressure Pm in the pressure supply passage 145a between the control valve 300 and the switching valve 350.

Figure 10A:
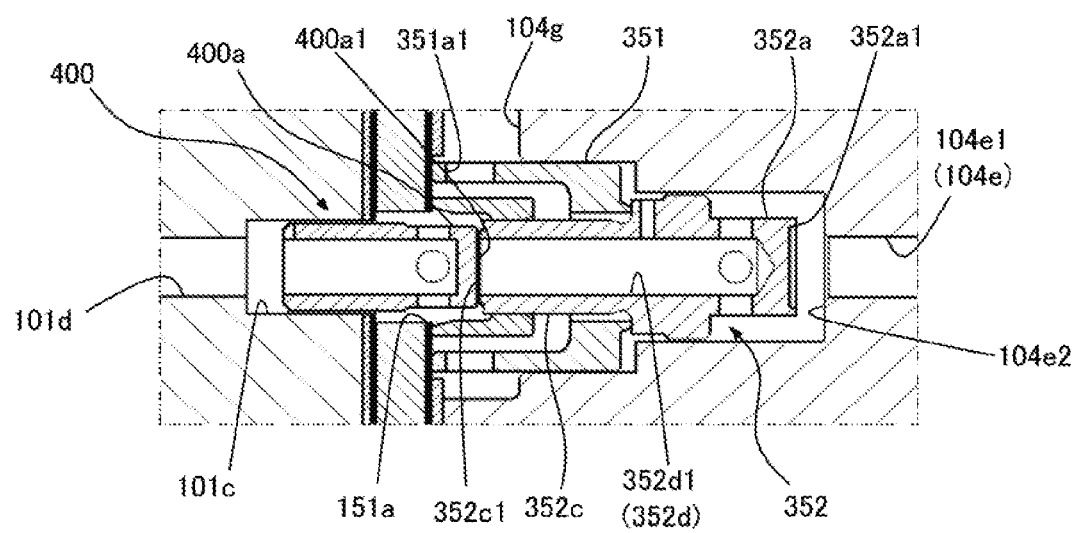
FIGS. 10A and 10B are views for describing the operation of the switching valve, when the control valve closes a pressure supply passage.

Then, when pressure Pm in the pressure supply passage 145a between the control valve 300 and the switching valve 350 becomes lower than pressure Pc in the crank chamber 140, the sub valve body 400, which is lighter than the main valve body 352, is actuated first, as illustrated in FIG. 10A. This causes the end surface 400a1 of the valve portion 400a of the sub valve body 400 to contact the end surface 352c1 of the stem portion 352c of the main valve body 352, so that the internal passage 352d of the main valve body 352 (or the end thereof on the second valve hole 151a side) is closed. Specifically, the sub valve body 400 is pressed by a small amount of refrigerant flow (backflow) flowing from the communication passage 101d constituting the pressure supply passage 145b between the switching valve 350 and the crank chamber 140 into the cylinder block-side recess 101c, so that the sub valve body 400 moves and closes the internal passage 352d of the main valve body 352.

This prevents the refrigerant from flowing into the pressure supply passage 145a between the control valve 300 and the switching valve 350 from the crack chamber 140, and causes the refrigerant in the pressure supply passage 145a between the control valve 300 and the switching valve 350 to flow out into the suction chamber 141 through the throttled passage 320. Thus, it is possible to reliably and rapidly reduce the pressure in the pressure supply passage 145a between the control valve 300 and the switching valve 350 to the pressure in the suction chamber 141. Thus, it is possible to reliably operate the main valve body 352 together with the sub valve body 400 by the increase in difference between pressure Pc in the crank chamber 140 and pressure Pm in the pressure supply passage 145a between the control valve 300 and the switching valve 350 (and by a hydrodynamic flow of the refrigerant flow caused thereby).

Figure 10B:
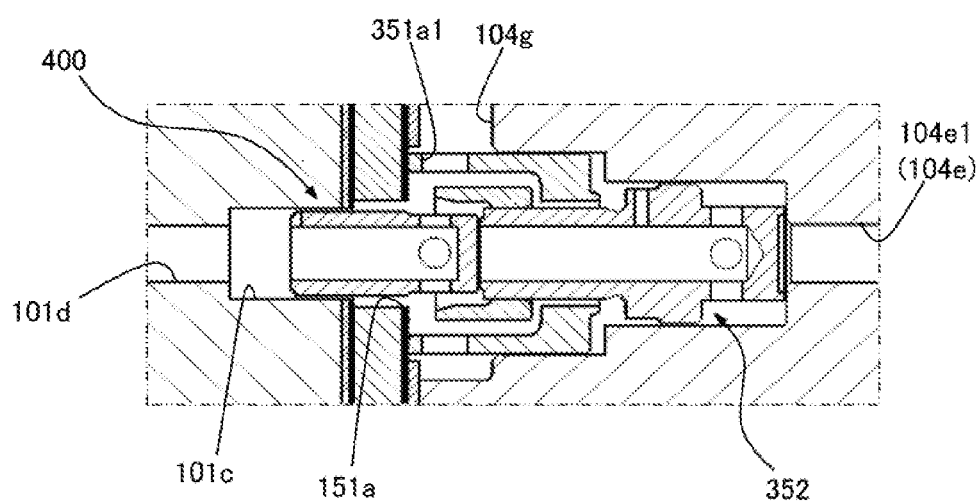

Then, when the main valve body 352 works with the sub valve body 400, as illustrated in FIG. 10B, the one end surface 352a1 of the first valve portion 352a of the main valve body 352 comes into contact with the first valve seat 104e2, to close the first valve hole 104e1, and the one end surface 352b1 of the second valve portion 352b of the main valve body 352 departs from the second valve seat 151b, to provides communication between the second valve hole 151a and the pressure release hole 351a1. That is, the switching valve 350 closes the pressure supply passage 145 and opens the first pressure release passage 146a.

Figure 11:
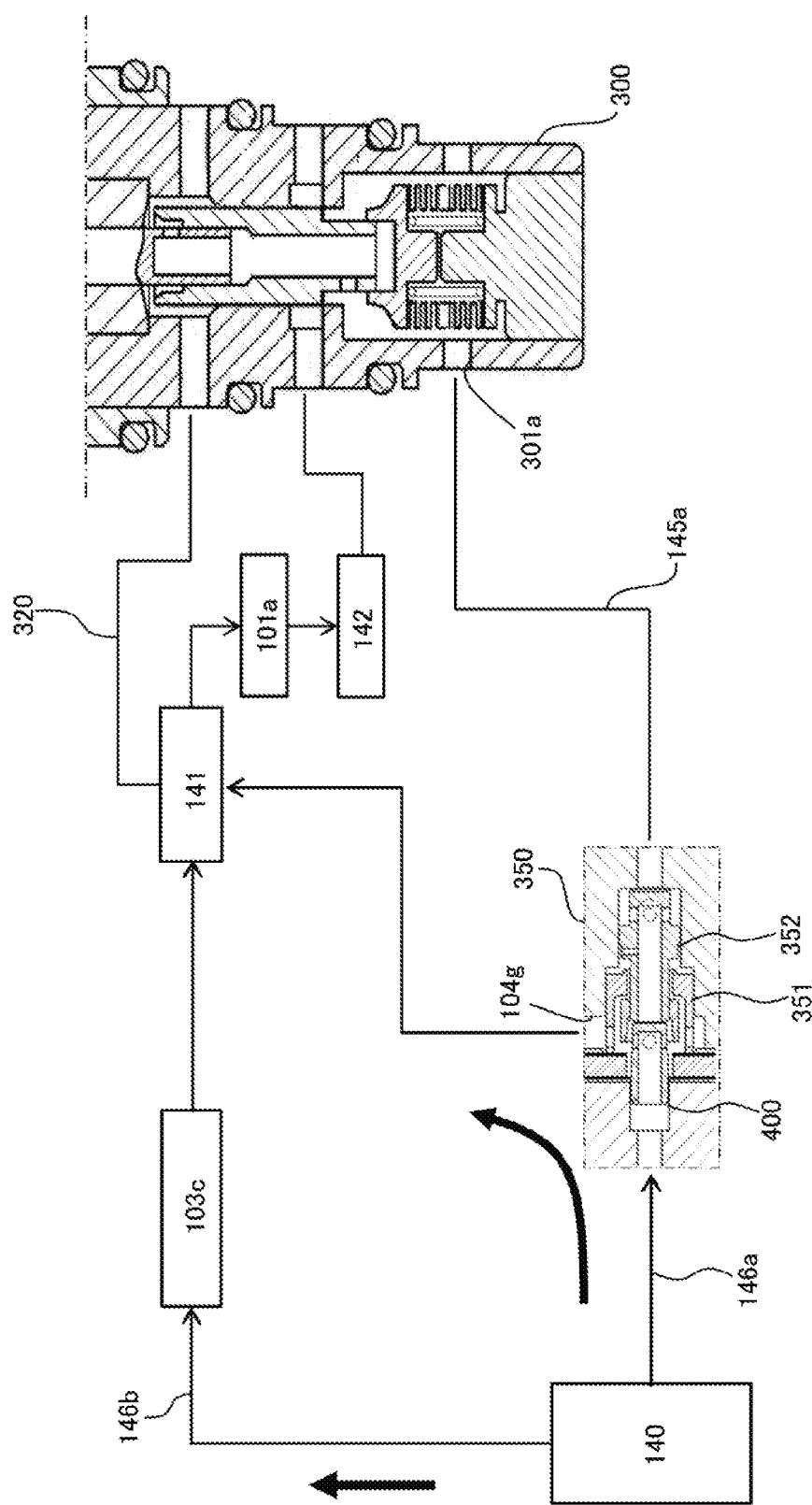
FIG. 11 is a diagram for describing the operation of the variable displacement compressor (the control valve and the switching valve).

This causes the crank chamber 140 and the suction chamber 141 to communicate through the first pressure release passage 146a and the second pressure release passage 146b, and the opening degree (passage cross-sectional area) of the pressure release passage for providing communication between the crank chamber 140 and the suction chamber 141 is maximized (see FIG. 11). This allows the refrigerant in the crank chamber 140 to rapidly flow out into the suction chamber 141, and the pressure in the crank chamber 140 to be equal to the pressure in the suction chamber 141. This maximizes the inclination angle of the swash plate 111, and the stroke (discharge displacement) of the piston 136. Furthermore, the discharge check valve 200 opens to circulate the refrigerant through the air conditioning system, and the air conditioning system is activated. Here, when a liquid refrigerant is stored in the crank chamber 140, the liquid refrigerant flows through the internal passage of the switching valve 350 (the internal passage 352$d$ of the main valve body 352, the sub valve body internal passage 400$d$). In this case, since the density of the refrigerant becomes significantly greater than that in a gas state, the dynamic pressure increases, and thus, it becomes possible to reliably move the main valve body 352 and the sub valve body 400.

Figure 12:
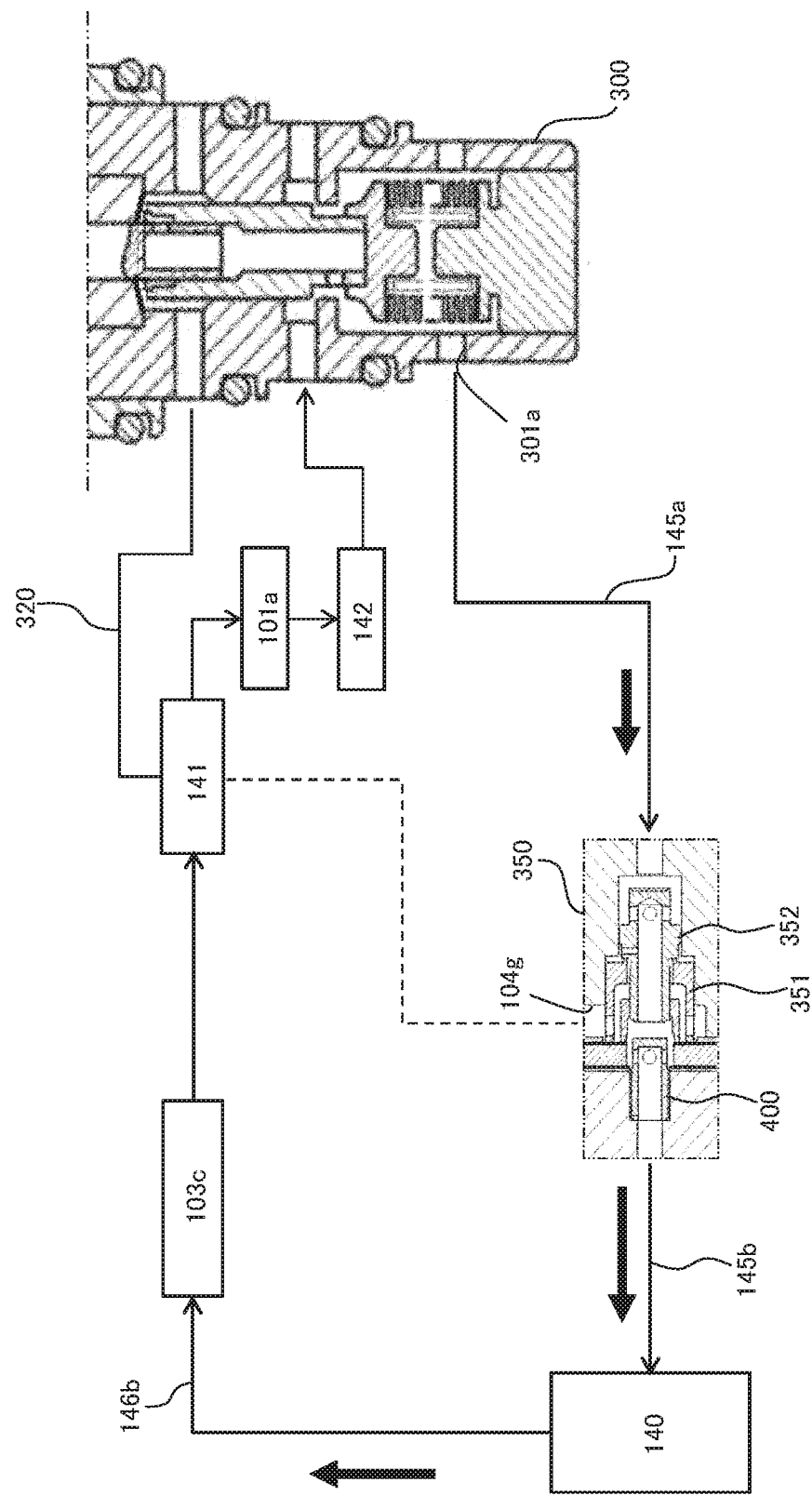
FIG. 12 is a diagram for describing the operation of the variable displacement compressor (the control valve and the switching valve).

Then, when the pressure in the suction chamber 141 decreases to the set pressure set in accordance with the current flowing to the molded coil 314, the valve body 304 of the control valve 300 opens the valve hole 301$c$ (that is, the control valve 300 opens the pressure supply passage 145), the discharged refrigerant is supplied to the pressure supply passage 145$a$ between the control valve 300 and the switching valve 350, and thus, pressure Pm in the pressure supply passage 145$a$ between the control valve 300 and the switching valve 350 increases. Then, when the pressure on the side of the first valve hole 104$e$1 acting on the main valve body 352 exceeds pressure Pc in the crank chamber 140 (=pressure in the suction chamber 141) acting on the opposite side thereof, the main valve body 352 and the sub valve body 400 actuate. That is, the one end surface 352$a$1 of the first valve portion 352$a$ of the main valve body 352 departs from the first valve seat 104$e$2, and simultaneously, the one end surface 352$b$1 of the second valve portion 352$b$ of the main valve body 352 comes into contact with the second valve seat 151$b$, and the end surface 400$a$1 of the valve portion 400$a$ of the sub valve body 400 departs from the end surface 352$c$1 of the stem portion 352$c$ of the main valve body 352, and simultaneously, the end surface 400$c$1 of the larger outer diameter portion 400$c$ of the sub valve body 400 comes into contact with the bottom surface 101$c$1 of the cylinder block-side recess 101$c$. That is, the switching valve 350 closes the first pressure release passage 146$a$ and opens the pressure supply passage. Thus, the crank chamber 140 and the suction chamber 141 communicate only through the second pressure release passage 146$b$, and the opening degree (passage cross-sectional area) of the pressure release passage providing communication between the crank chamber 140 and the suction chamber 141 is minimized. Furthermore, the discharged refrigerant is supplied to the crank chamber 140 (see FIG. 12). Thus, the pressure in the crank chamber 140 increases in accordance with the adjustment of the opening degree (passage cross-sectional area) of the pressure supply passage 145 by control valve 300. This decreases the inclination angle of swash plate 111, and the stroke (discharge displacement) of the piston 136 (that is, the variable displacement compressor 100 is in a state in which the discharge displacement is controlled).

In the variable displacement compressor 100 according to the present embodiment, the switching valve 350 is configured so that, when the control valve 300 closes the pressure supply passage 145 and pressure Pm in the pressure supply passage 145$a$ between the control valve 300 and the switching valve 350 decreases, the sub valve body 400 formed to be lighter than the main valve body 352 actuates before the main valve body 352, to close the internal passage 352$d$ of the main valve body 352. Thus, the refrigerant in the pressure supply passage 145$a$ between the control valve 300 and the switching valve 350 rapidly and reliably flows out into the suction chamber 141 via the throttle passage 320, and thus, compared with the conventional one, it is possible to rapidly reduce the pressure in the pressure supply passage 145$a$ between the control valve 300 and the switching valve 350 to the pressure in the suction chamber 141. This makes it possible to prevent a delay of movement of the main valve body 352 in the direction to provide communication between the second valve hole 151$a$ and the pressure release hole 351$a$1 (to open the first pressure release passage 146$a$), and a delay of release of a pressure in the crank chamber 140 caused thereby.

The main valve body 352 is configured so that, when the one end surface 352$b$1 of the second valve portion 352$b$ comes into contact with the second valve seat 151$b$, the other end surface 352$a$2 of the first valve portion 352$a$ of the main valve body 352 contacts the annular protruding portion 351$b$2 of the partition member 351. This makes it possible to reduce the contact area between the other end surface 352$a$2 of the first valve portion 352$a$ and the partition member 351, and to prevent an increase in sticking force or the like due to oil acting on the main valve body 352. This also makes it possible to reduce a delay of movement of the main valve body 352 in the direction to provide communication between the second valve hole 151$a$ and the pressure release hole 351$a$1 (to open the first pressure release passage 146$a$), and a delay of release of a pressure in the crank chamber 140 caused thereby.

Modification 1

In the above embodiment, the throttle passage 320 is provided inside the control valve 300. However, the present invention is not limited thereto, and the throttle passage 320 may be configured so that the throttle passage 320 is provided outside the control valve 300 and causes the pressure supply passage 145$a$ between the control valve 300 and the switching valve 350 to communicate with the suction chamber 141. For example, the throttle passage 320 may be formed in the cylinder head 104 to provide communication between the first accommodation chamber 104$b$ and the suction chamber 141.

Modification 2

Figure 13:
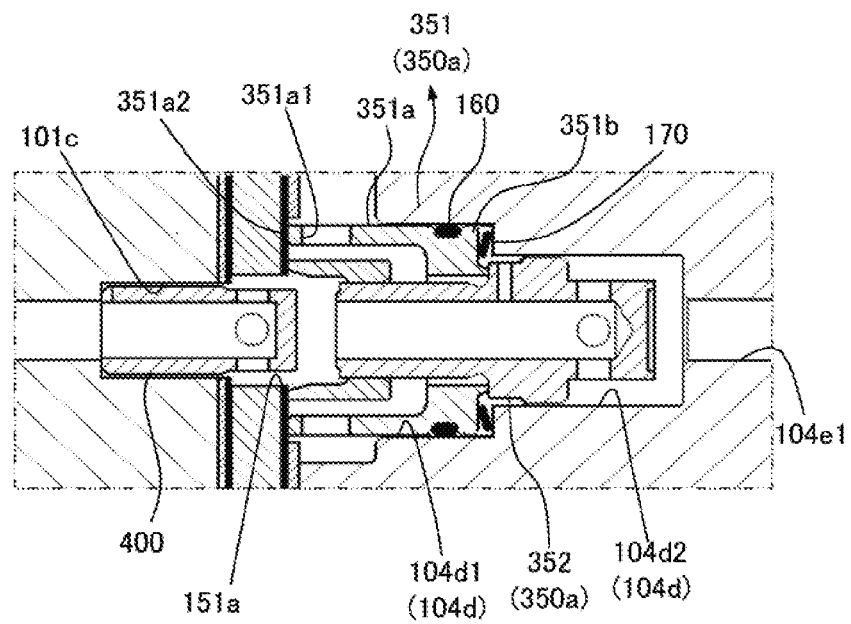
FIG. 13 is a cross-sectional view illustrating a modification of the switching valve.

In the above embodiment, the valve assembly 350$a$ (or the partition member 351 thereof) is press-fitted and secured to the cylinder head-side recess 104$d$. However, the present invention is not limited thereto, and the valve assembly 350$a$ may be configured to be removable from the cylinder head-side recess 104$d$. In this case, as illustrated in FIG. 13, it is preferable that a sealing member 160 having elasticity be disposed between the outer peripheral surface of the peripheral wall 351$a$ of the partition member 351 and the inner peripheral surface of the larger inner diameter portion 104$d$1 of the cylinder head-side recess 104$d$, and that a biasing member 170 be disposed between the bottom surface of the larger inner diameter portion 104$d$1 of the cylinder head-side recess 104$d$ and the end wall 351$b$ of the partition member 351.

For example, the sealing member 160 may be an O-ring. The biasing member 170 urges the valve assembly 350$a$ toward the discharge valve forming plate 151 such that the end surface 351$a$2 of the peripheral wall 351$a$ of the partition member 351 presses the valve plate 103 via the discharge valve forming plate 151. The biasing member 170 may be a wave washer, a disc spring, and/or a coil spring, or the like.

In this way, it is possible to reliably bring the end surface 351$a$2 of the peripheral wall 351$a$ of the partition member 351 into contact with the discharge valve forming plate 151. Furthermore, the valve assembly 350$a$ is held in the cylinder head-side recess 104$d$ by the elastic force of the sealing member 160. Thus, the valve assembly 350$a$ and the biasing member 170 do not come off from the cylinder head-side recess 104d during the assembly of the variable displacement compressor 100, and thus, it is possible to prevent reduction in efficiency of assembly work of the variable displacement compressor 100 is not impaired.

Modification 3

Figure 14:
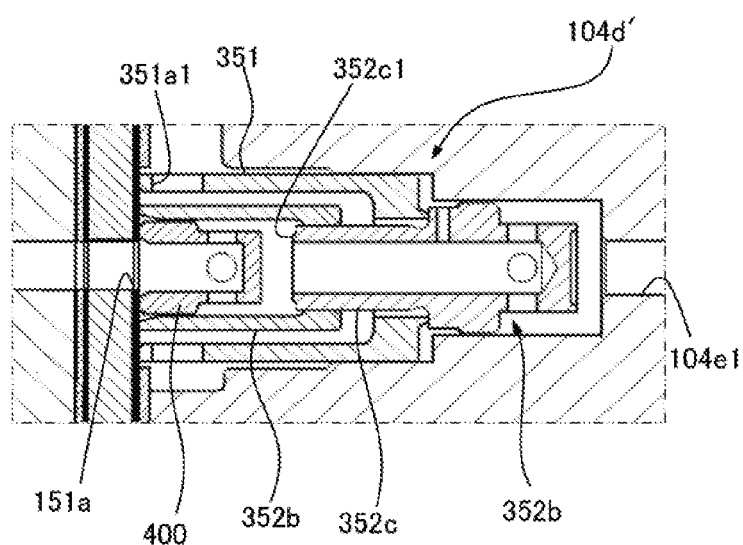
FIG. 14 is a cross-sectional view illustrating a modification of the switching valve.

In the above embodiment, the valve assembly 350a (the partition member 351 and the main valve body 352) is disposed in the cylinder head-side recess 104d, and the sub valve body 400 is disposed in the cylinder block-side recess 101c. However, the present invention is not limited thereto. As illustrated in FIG. 14, both the valve assembly 350a and the sub valve body 400 may be disposed in the cylinder head-side recess 104d'. In this case, for example, the sub valve body 400 is disposed between the second valve hole 151a and the end surface 352c1 of the stem portion 352c of the main valve body 352.

Modification 4

Figure 15:
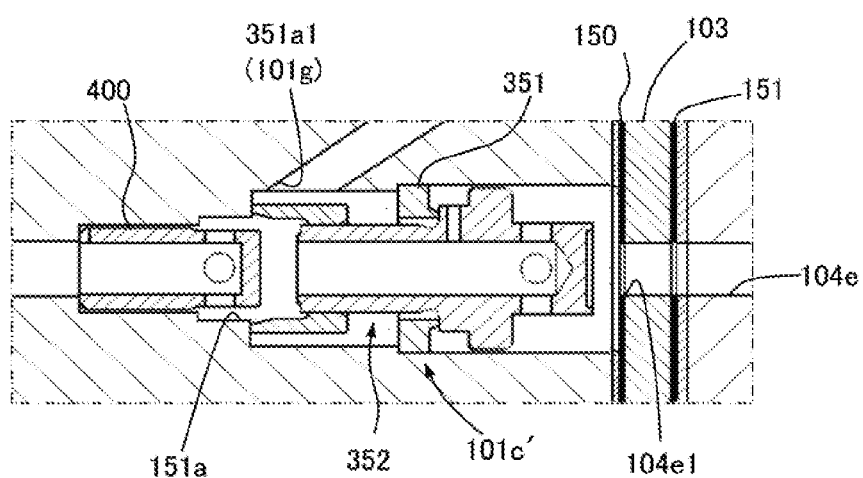
FIG. 15 is a cross-sectional view illustrating a modification of the switching valve.

As illustrated in FIG. 15, both the valve assembly 350a and the sub valve body 400 may be disposed in the cylinder block-side recess 101c'. In this case, for example, the first valve hole 104e1 is formed in the suction valve forming plate 150, and the second valve hole 151a is formed in the cylinder block-side recess 101c'. One end of a communication passage 101g providing communication between the cylinder block-side recess 101c' and the suction chamber 141 constitutes the pressure release hole 351a1.

Second Embodiment

Figure 16:
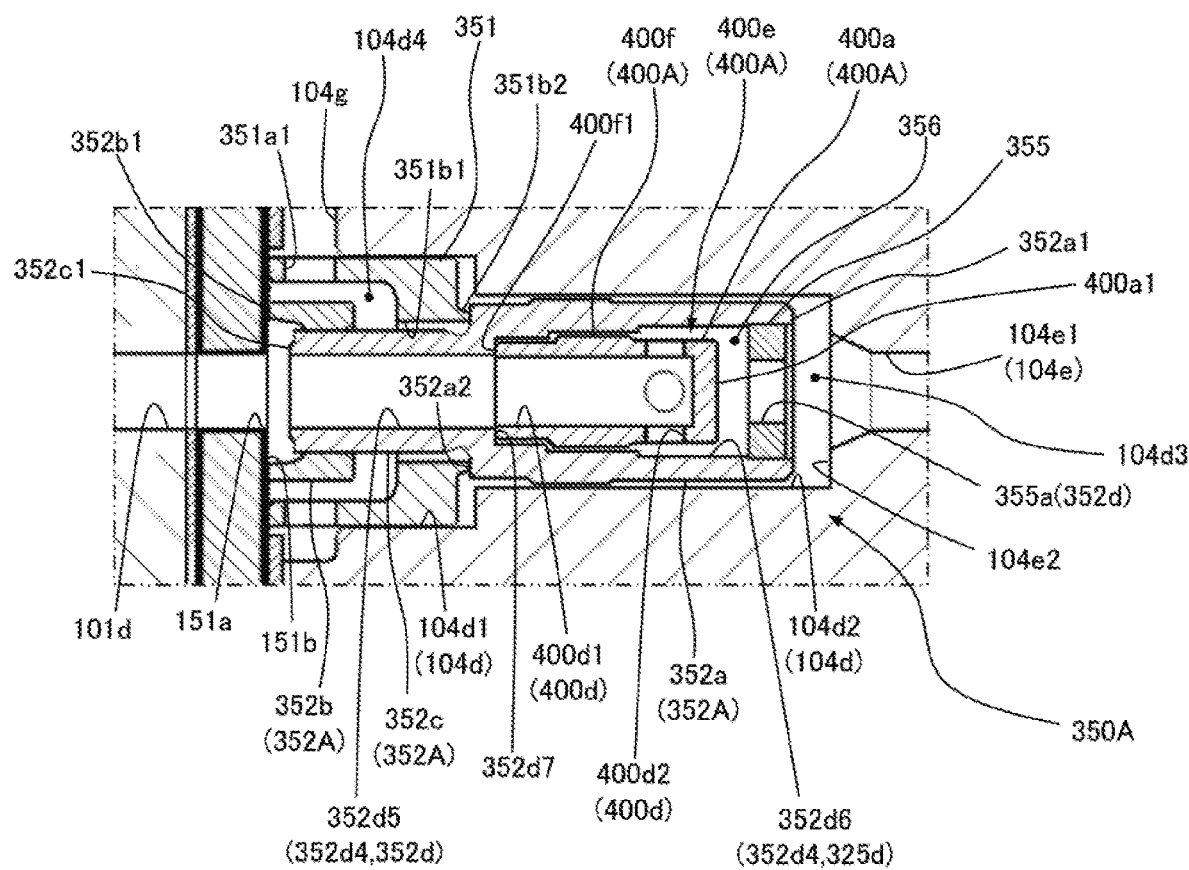
FIG. 16 is a cross-sectional view illustrating a switching valve according to a second embodiment of the variable displacement compressor.

FIG. 16 is a cross-sectional view illustrating a switching valve 350A according to a second embodiment. Elements common to those of the first embodiment are denoted by the same reference symbols, and different elements will be mainly described. The configuration, operation, and the like, of the variable displacement compressor 100 in a case in which the switching valve 350A according to the second embodiment is used instead of the switching valve 350 according to the first embodiment, is basically the same as those described above, but is different in the switching valve 350A is used instead of the switching valve 350.

In the switching valve 350 according to the first embodiment, the valve assembly 350a in which the partition member 351 and the main valve body 352 are integrated, and the sub valve body 400 are separated, and the valve assembly 350a is accommodated in the cylinder head-side recess 104d and the sub valve body 400 is accommodated in the cylinder block-side recess 101c. That is, in the switching valve 350 according to the first embodiment, the sub valve body 400 is disposed to be closer to the crank chamber 140 that the main valve body 352 (valve assembly 350a) is. In contrast, in the switching valve 350A according to the second embodiment, the partition member 351, the main valve body 352A and a sub valve body 400A are integrated and accommodated in the cylinder head-side recess 104d (larger inner diameter portion 104d1 and smaller inner diameter portion 104d2). Specifically, in the switching valve 350A according to the second embodiment, the sub valve body 400A is disposed in the internal passage 352d of the main valve body 352A. Also in the switching valve 350A according to the second embodiment, the sub valve body 400A is formed to be lighter than the main valve body 352A.

In the switching valve 350A according to the second embodiment, similarly to the main valve body 352 of the switching valve 350 according to the first embodiment, a main valve body 352A includes: a first valve portion 352a disposed inside the first valve chamber 104d3 and adapted to contact and depart from the first valve seat 104e2 surrounding the first valve hole 104e1; a second valve portion 352b disposed inside the second valve chamber 104d4 and adapted to contact and depart from the second valve seat 151b surrounding the second valve hole 151a; and a stem portion 352c connecting the first valve portion 352a and the second valve portion 352b, and inserted through the insertion hole 351b1 formed in the partition member 351. When the one end surface 352a1 of the first valve portion 352a departs from the first valve seat 104e2 and the one end surface 352b1 of the second valve portion 352b contacts the second valve seat 151b, the other end surface 352a2 of the first valve portion 352a comes into contact with the annular protruding portion 351b2 of the partition member 351. This blocks the communication between the first valve chamber 104d3 and the second valve chamber 104d4 through the insertion hole 351b1.

In the main valve body 352A, there is formed a through passage 352d4 penetrating from the one end surface 352c1 of the stem portion 352c to the one end surface 352a1 of the first valve portion 352a. In the present embodiment, the through passage 352d4 has a smaller inner diameter portion 352d5 on the one end surface 352c1 side of the stem portion 352c, and a larger inner diameter portion 352d6 on the one end surface 352a1 side of the first valve portion 352a, the larger inner diameter portion 352d6 being formed to have a larger diameter than that of the smaller inner diameter portion 352d5. To an end portion on the one end surface 352a1 side of the first valve portion 352a of the through passage 352d4 (that is, an end portion of the larger inner diameter portion 352d6), there is attached an annular plate-shaped attaching member 355 formed separately from the main valve body 352A, by press-fitting or the like. In the switching valve 350A according to the second embodiment, the through passage 352d4 and an inner hole 355a of the attaching member 355 form an internal passage 352d for providing communication between the first valve hole 104e1 and the second valve hole 151a. The larger inner diameter portion 352d6 of the through passage 325d4, to which the attaching member 355 is secured at its end portion, forms a sub valve body accommodation chamber 356 that accommodates the sub valve body 400A in a manner movable in the axial direction.

The sub valve body 400A has: a valve portion forming portion 400e including the valve portion (sub valve body valve portion) 400a that contacts and departs from the attaching member 355 forming the inner wall of the sub valve body accommodation chamber 356; and a supported portion 400f formed such that at least a part of the supported portion 400f has an outer diameter greater than that of the valve portion forming portion 400e and supported on the inner peripheral surface of the larger inner diameter portion 352d6 of the through passage 352d4 with a predetermined clearance. The sub valve body 400A moves within the sub valve body accommodation chamber 356, and the end surface 400a1 of the valve portion 400a of the sub valve body 400A contacts and departs from the attaching member 355, to thereby open and close the inner hole 355a of the attaching member 355 that constitutes a part of the internal passage 352d of the main valve body 352A, that is, the end of the internal passage 352d of the main valve body 352A on the first valve hole 104e1 side. The movement of the sub valve body 400A in the direction in which the valve portion 400a moves away from the attaching member 355 is regulated by a peripheral portion of an end surface 400f1 of the supported portion 400f and its vicinity contacting a connecting end surface 325d7 between the smaller inner diameter portion 325d5 and the larger inner diameter portion 325d6 of the through passage 352d4 of the main valve body 352A.

Furthermore, the sub valve body 400A has an internal passage (sub valve body internal passage) 400d, similarly to the sub valve body 400 of the switching valve 350 according to the first embodiment. The internal passage 400d includes a first passage 400d1 extending in the axial direction of the sub valve body 400A, and a second passage 400d2 connected to the first passage 400d1. One end of the first passage 400d1 is open at the end surface 400f1 of the supported portion 400f and communicates with the second valve hole 151a via the smaller inner diameter portion 352d5 of the through passage 352d4 of the main valve body 352A. The other end of the first passage 400d1 is a closed end. The second passage 400d2 is formed in the valve portion forming portion 400e, and provides communication between the first passage 400d1 and the sub valve body accommodation chamber 356. The sub valve body accommodation chamber 356 communicates with the first valve hole 104e1, when the end surface 400a1 of the valve portion 400a of the sub valve body 400A departs from the attaching member 355 and the inner hole 355a is opened. That is, in the present embodiment, the internal passage 400d of the sub valve body 400A provides communication between the first valve hole 104e1 and the second valve hole 151a in cooperation with the internal passage 352d of the main valve body 352A, when the end surface 400a1 of the valve portion 400a of the sub valve body 400A departs from the attaching member 355 and the inner hole 355a of the attaching member 355 is opened, that is, when the valve portion 400a of the sub valve body 400A opens the end of the internal passage 352d of the main valve body 352A on the first valve hole 104e1 side.

Operation of Switching Valve 350A

The operation of the switching valve 350A according to the second embodiment will be described with reference to FIGS. 16, 17A and 17B.

When pressure Pm in the pressure supply passage 145a between the control valve 300 and the switching valve 350A is higher than pressure Pc in the crank chamber 140, the one end surface 352a1 of the first valve portion 352a of the main valve body 352A departs from the first valve seat 104e2, and simultaneously, the one end surface 352b1 of the second valve portion 352b of the main valve body 352A contacts the second valve seat 151b. Furthermore, the end surface 400a1 of the valve portion 400a of the sub valve body 400A departs from the attaching member 355, and simultaneously, the peripheral portion of the end surface 400f1 of the supported portion 400f of the sub valve body 400A and its vicinity contact the connecting end surface 325d7 of the through passages 352d4 of the main valve body 352A (see FIG. 16). That is, the sub valve body 400A opens the internal passage 352d of the main valve body 352A (or the end portion thereof on the first valve hole 104e1 side). In this case, the first valve hole 104e1 and the second valve hole 151a communicate through the internal passage 352d of the main valve body 352A and the internal passage 400d of the sub valve body 400A, and simultaneously, the communication between the second valve hole 151a and the pressure release hole 351a1 is blocked.

This causes the communication passage 104e constituting the pressure supply passage 145a between the control valve 300 and the switching valve 350A to communicate with the communication passage 101d constituting the pressure supply passage 145b between the switching valve 350A and the crank chamber 140, through the first valve hole 104e1, the internal passage 352d of the main valve body 352A (the inner hole 355a of the attaching member 355, the through passage 352d4), the internal passage 400d of the sub valve body 400A, and the second valve hole 151a. That is, the switching valve 350A opens the pressure supply passage 145 and simultaneously closes the first pressure release passage 146a.

Figure 17A:
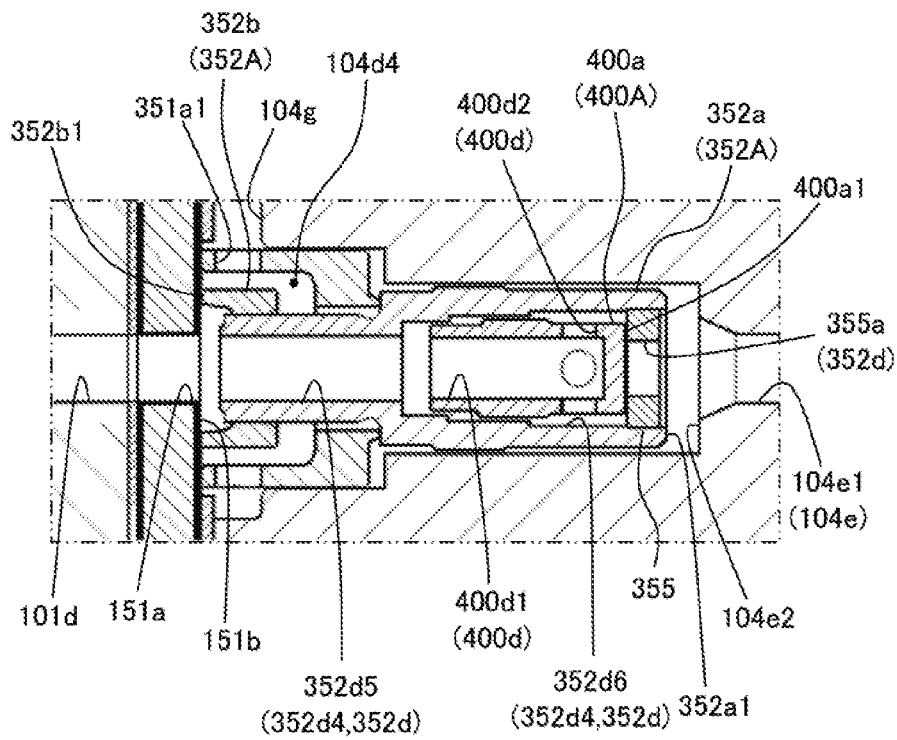
FIGS. 17A and 17B are views for describing the operation of the switching valve according to the second embodiment, when the control valve closes the pressure supply passage.

Then, as illustrated in FIG. 17A, when the control valve 300 closes the pressure supply passage 145 and pressure Pm in the pressure supply passage 145a between the control valve 300 and the switching valve 350A becomes lower than pressure Pc in the crank chamber 140, the sub valve body 400A, which is lighter than the main valve body 352A, is actuated first, and the end surface 400a1 of the valve portion 400a of the sub valve body 400A contacts the attaching member 355, so that the inner hole 355a of the attaching member 355, that is, the internal passage 352d of the main valve body 352A (or the end thereof on the first valve hole 104e1 side) is closed. Specifically, the sub valve body 400A is pressed by a small amount of refrigerant flow (backflow) flowing from the communication passage 101d constituting the pressure supply passage 145b between the switching valve 350A and the crank chamber 140 into the first passage 400d1 of the sub valve body 400A passing through the second valve hole 151a and the smaller inner diameter portion 352d5 of the through passage 352d4 of the main valve body 352A and contacting the closed end of the first passage 400d1, so that the sub valve body 400A moves and closes the internal passage 352d of the main valve body 352A.

This prevents the refrigerant from flowing into the pressure supply passage 145a between the control valve 300 and the switching valve 350A from the crank chamber 140, and causes the refrigerant in the pressure supply passage 145a between the control valve 300 and the switching valve 350A to flow out into the suction chamber 141 through the throttled passage 320. Thus, it is possible to reliably and rapidly reduce the pressure in the pressure supply passage 145a between the control valve 300 and the switching valve 350A to the pressure in the suction chamber 141. Thus, it is possible to reliably operate the main valve body 352A together with the sub valve body 400A by the increase in difference between pressure Pc in the crank chamber 140 and pressure Pm in the pressure supply passage 145a between the control valve 300 and the switching valve 350A (and by a hydrodynamic flow of the refrigerant flow caused thereby).

Figure 17B:
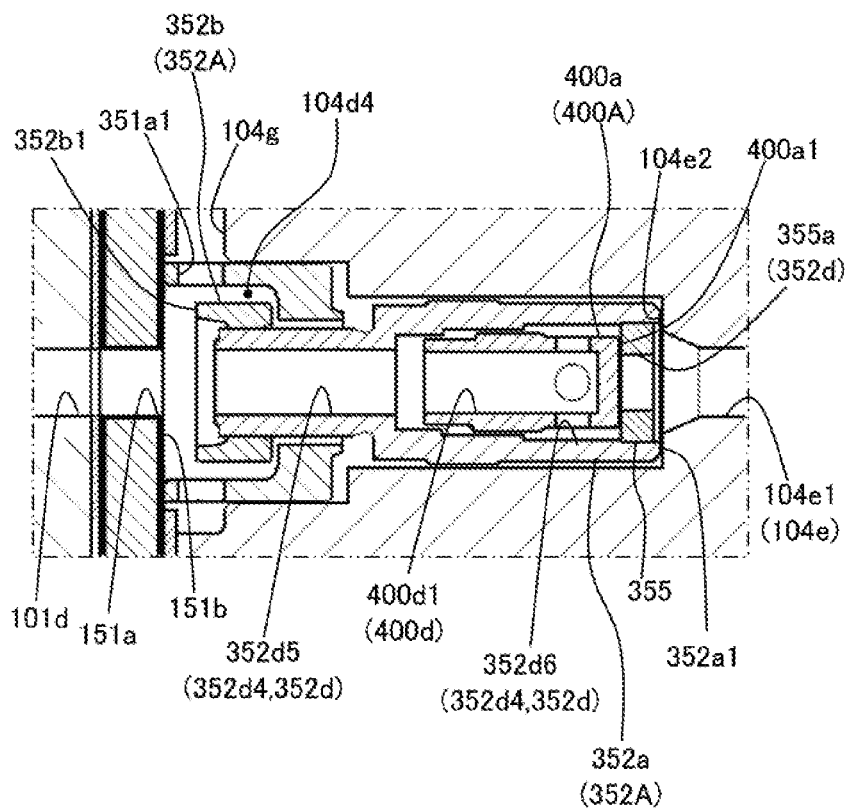

Then, when the main valve body 352A works with the sub valve body 400A, as illustrated in FIG. 17B, the one end surface 352a1 of the first valve portion 352a of the main valve body 352A comes into contact with the first valve seat 104e2, and the sub valve body 400A, which closes the internal passage 352d of the main valve body 352A (or the end thereof on the first valve hole 104e1 side), closes the first valve hole 104e1, so that the one end surface 352b1 of the second valve portion 352b of the main valve body 352A departs from the second valve seat 151b. In this case, the communication between the first valve hole 104e1 and the second valve hole 151a is blocked, and the second valve hole 151a communicates with the pressure release hole 351a1.

This causes the communication passage 101d constituting the pressure supply passage 145b between the switching valve 350A and the crank chamber 140 to communicate with the suction chamber 141 through the second valve hole 151a, the second valve chamber 104d4, the pressure release hole 351a1 and the communication passage 104g. That is, the switching valve 350A closes the pressure supply passage 145 and simultaneously opens the first pressure release passage 146a. Thus, the crank chamber 140 and the suction chamber 141 communicate through the first pressure release passage 146a and the second pressure release passage 146b, so that the opening degree (passage cross-sectional area) of the pressure release passage for providing communication between the crank chamber 140 and the suction chamber 141 is maximized. This allows the refrigerant in the crank chamber 140 to rapidly flow out into the suction chamber 141, and the pressure in the crank chamber 140 to be equal to the pressure in the suction chamber 141.

Then, when the control valve 300 opens the pressure supply passage 145 and pressure Pm in the pressure supply passage 145a between the control valve 300 and the switching valve 350A exceeds pressure Pc in the crank chamber 140 (=the pressure in the suction chamber 141), the main valve body 352A and the sub valve body 400A actuate. That is, the one end surface 352a1 of the first valve portion 352a of the main valve body 352A departs from the first valve seat 104e2 and the one end surface 352b1 of the second valve portion 352b of the main valve body 352A comes into contact with the second valve seat 151b, and simultaneously, the sub valve body 400A departs from the attaching member 355 and opens the internal passage 352d of the main valve body 352A (see FIG. 16). That is, the switching valve 350A opens the pressure supply passage 145 and simultaneously closes the first pressure release passage 146a.

Although the embodiments and modifications of the present invention have been described above, the present invention is not limited thereto, and further modifications and changes can be made based on the technical concept of the present invention.

For example, the control valve 300 may be a mechanical control valve without a solenoid, or may be a solenoid valve without a pressure sensing member, such as bellows. Furthermore, the present invention is not limited to the swash-plate variable displacement compressor, and may be applied to various variable displacement compressors capable of changing the discharge displacement in accordance with the pressure in the controlled pressure chamber.

REFERENCE SYMBOL LIST

100 Variable displacement compressor
101 Cylinder block
101a Cylinder bore (compression section)
101c Cylinder block-side recess
103 Valve plate
104 Cylinder head
104b First accommodation chamber
104d Cylinder head-side recess
104d3 First valve chamber
104d4 Second valve chamber
104e1 First valve hole
104e2 First valve seat
107 Second accommodation chamber
136 Piston (compression section)
140 Crank chamber (controlled pressure chamber)
141 Suction chamber
142 Discharge chamber
145, 145a, 145b Pressure supply passage
146a, 146b Pressure release passage
150 Suction valve formatting plate
151 Discharge valve formed plate
151a Second valve hole
151b Second valve seat
300 Control valve
350, 350A Switching valve
350a Valve assembly
351 Partition member
351a1 Pressure release hole
351b1 Insertion hole
351b2 Annular protruding portion
352, 352A Main valve body
352a First valve part
352b Second valve part
352c Stem portion
352d Internal passage
400, 400A Sub valve body
400a Valve portion (sub valve body valve portion)
400d Internal passage (sub valve body internal passage)

The invention claimed is:

1. A variable displacement compressor including a suction chamber into which a refrigerant, before being compressed, is introduced, a compression section that draws and compresses the refrigerant in the suction chamber, a discharge chamber into which the compressed refrigerant compressed by the compression section is discharged, and a controlled pressure chamber, in which a discharge displacement changes in accordance with a pressure in the controlled pressure chamber, the variable displacement compressor comprising:
  a control valve disposed in a pressure supply passage for supplying the refrigerant in the discharge chamber to the controlled pressure chamber, the control valve being adapted to adjust an opening degree of the pressure supply passage;
  a switching valve disposed in the pressure supply passage to be closer to the controlled pressure chamber than the control valve is, the switching valve switching between a first state in which the switching valve provides communication between a first valve hole communicating with a first portion of the pressure supply passage between the control valve and the switching valve, and a second valve hole communicating with a second portion of the pressure supply passage between the switching valve and the controlled pressure chamber, and a second state in which the switching valve provides communication between the second valve hole and a pressure release hole communicating with the suction chamber; and
  a throttle passage that provides communication between the first portion of the pressure supply passage between the control valve and the switching valve, and the suction chamber,
the switching valve comprising:
  a main valve body including an internal passage for providing communication between the first valve hole and the second valve hole, the main valve body being adapted to operate so that the main valve body blocks the communication between the second valve hole and the pressure release hole, when a pressure in the first portion of the pressure supply passage between the control valve and the switching valve is higher than a pressure in the controlled pressure chamber, whereas the main valve body provides communication between the second valve hole and the pressure release hole, when the pressure in the first portion of the pressure supply passage between the control valve and the switching valve is lower than the pressure in the controlled pressure chamber; and
  a sub valve body adapted to operate so that the sub valve body opens the internal passage of the main valve body, when the pressure in the first portion of the pressure supply passage between the control valve and the switching valve is higher than the pressure in the controlled pressure chamber, whereas the sub valve body closes the internal passage of the main valve body, when the pressure in the first portion of the pressure supply passage between the control valve and the switching valve is lower than the pressure in the controlled pressure chamber, wherein the sub valve body is formed to be lighter than the main valve body, and the sub valve body actuates before the main valve body to close the internal passage of the main valve body, when the control valve closes the pressure supply passage and the pressure in the first portion of the pressure supply passage between the control valve and the switching valve decreases.

2. The variable displacement compressor according to claim 1, wherein the main valve body is made of a metal material, and the sub valve body is made of a resin material.

3. The variable displacement compressor according to claim 1, wherein the main valve body is configured so that, when the pressure in the first portion of the pressure supply passage between the control valve and the switching valve is higher than the pressure in the controlled pressure chamber, the main valve body departs from a first valve seat surrounding the first valve hole and comes into contact with a second valve seat surrounding the second valve hole, to block the communication between the second valve hole and the pressure release hole, whereas when the pressure in the first portion of the pressure supply passage between the control valve and the switching valve is lower than the pressure in the controlled pressure chamber, the main valve body comes into contact with the first valve seat and departs from the second valve seat, to provide communication between the second valve hole and the pressure release hole.

4. The variable displacement compressor according to claim 3, wherein the main valve body is configured to close the first valve hole by contacting the first valve seat, whereas the main valve body is configured to open the first valve hole and provides communication between the first valve hole and the second valve hole through the internal passage by departing from the first valve seat.

5. The variable displacement compressor according to claim 4, wherein the sub valve body is disposed to be closer to the controlled pressure chamber than the main valve body is, and the sub valve body includes a sub valve body valve portion that is configured to open and close a second valve hole-side end of the internal passage of the main valve body, and a sub valve body internal passage that provides communication between the second portion of the pressure supply passage between the switching valve and the controlled pressure chamber, and the second valve hole.

6. The variable displacement compressor according to claim 3, wherein the main valve body is configured to provide communication between the first valve hole and the second valve hole through the internal passage in both cases in which the main valve body contacts the first valve seat and departs from the first valve seat.

7. The variable displacement compressor according to claim 6, wherein the sub valve body is disposed in the internal passage of the main valve body, and the sub valve body includes a sub valve body valve portion that opens and closes a first valve hole-side end of the internal passage of the main valve body, and a sub valve body internal passage that provides communication between the first valve hole and the second valve hole in cooperation with the internal passage of the main valve body, when the sub valve body valve portion opens the first valve hole-side end of the internal passage of the main valve body.

8. The variable displacement compressor according to claim 3, wherein the switching valve further comprises:

a partition member that partitions into a first valve chamber including the first valve hole and the first valve seat, and a second valve chamber including the second valve seat and the pressure release hole, the partition member including an insertion hole providing communication between the first valve chamber and the second valve chamber, and an annular protruding portion formed around the insertion hole and protruding to the first valve chamber, wherein the main valve body includes: a first valve portion disposed in the first valve chamber and adapted to contact and depart from the first valve seat; a second valve portion disposed in the second valve chamber and adapted to contact and depart from the second valve seat; and a stem portion that connects the first valve portion and the second valve portion and inserted through the insertion hole of the partition member, the main valve body being configured so that when the second valve portion comes into contact with the second valve seat, a portion of the first valve portion opposite to a portion that is adapted to contact and depart from the first valve seat comes into contact with the annular protruding portion of the partition member, to block the communication between the first valve chamber and the second valve chamber through the insertion hole.

9. The variable displacement compressor according to claim 2, wherein the main valve body is configured so that, when the pressure in the first portion of the pressure supply passage between the control valve and the switching valve is higher than the pressure in the controlled pressure chamber, the main valve body departs from a first valve seat surrounding the first valve hole and comes into contact with a second valve seat surrounding the second valve hole, to block the communication between the second valve hole and the pressure release hole, whereas when the pressure in the first portion of the pressure supply passage between the control valve and the switching valve is lower than the pressure in the controlled pressure chamber, the main valve body comes into contact with the first valve seat and departs from the second valve seat, to provide communication between the second valve hole and the pressure release hole.

10. The variable displacement compressor according to claim 4, wherein the switching valve further comprises:

a partition member that partitions into a first valve chamber including the first valve hole and the first valve seat, and a second valve chamber including the second valve seat and the pressure release hole, the partition member including an insertion hole providing communication between the first valve chamber and the second valve chamber, and an annular protruding portion formed around the insertion hole and protruding to the first valve chamber, wherein the main valve body includes: a first valve portion disposed in the first valve chamber and adapted to contact and depart from the first valve seat; a second valve portion disposed in the second valve chamber and adapted to contact and depart from the second valve seat; and a stem portion that connects the first valve portion and the second valve portion and inserted through the insertion hole of the partition member, the main valve body being configured so that when the second valve portion comes into contact with the second valve seat, a portion of the first valve portion opposite to a portion that is adapted to contact and depart from the first valve seat comes into contact with the annular protruding portion of the partition member, to block the communication between the first valve chamber and the second valve chamber through the insertion hole.

11. The variable displacement compressor according to claim 5, wherein the switching valve further comprises:
a partition member that partitions into a first valve chamber including the first valve hole and the first valve seat, and a second valve chamber including the second valve seat and the pressure release hole, the partition member including an insertion hole providing communication between the first valve chamber and the second valve chamber, and an annular protruding portion formed around the insertion hole and protruding to the first valve chamber,
wherein the main valve body includes: a first valve portion disposed in the first valve chamber and adapted to contact and depart from the first valve seat; a second valve portion disposed in the second valve chamber and adapted to contact and depart from the second valve seat; and a stem portion that connects the first valve portion and the second valve portion and inserted through the insertion hole of the partition member, the main valve body being configured so that when the second valve portion comes into contact with the second valve seat, a portion of the first valve portion opposite to a portion that is adapted to contact and depart from the first valve seat comes into contact with the annular protruding portion of the partition member, to block the communication between the first valve chamber and the second valve chamber through the insertion hole.

12. The variable displacement compressor according to claim 6, wherein the switching valve further comprises:
a partition member that partitions into a first valve chamber including the first valve hole and the first valve seat, and a second valve chamber including the second valve seat and the pressure release hole, the partition member including an insertion hole providing communication between the first valve chamber and the second valve chamber, and an annular protruding portion formed around the insertion hole and protruding to the first valve chamber,
wherein the main valve body includes: a first valve portion disposed in the first valve chamber and adapted to contact and depart from the first valve seat; a second valve portion disposed in the second valve chamber and adapted to contact and depart from the second valve seat; and a stem portion that connects the first valve portion and the second valve portion and inserted through the insertion hole of the partition member, the main valve body being configured so that when the second valve portion comes into contact with the second valve seat, a portion of the first valve portion opposite to a portion that is adapted to contact and depart from the first valve seat comes into contact with the annular protruding portion of the partition member, to block the communication between the first valve chamber and the second valve chamber through the insertion hole.

13. The variable displacement compressor according to claim 7, wherein the switching valve further comprises:
a partition member that partitions into a first valve chamber including the first valve hole and the first valve seat, and a second valve chamber including the second valve seat and the pressure release hole, the partition member including an insertion hole providing communication between the first valve chamber and the second valve chamber, and an annular protruding portion formed around the insertion hole and protruding to the first valve chamber,
wherein the main valve body includes: a first valve portion disposed in the first valve chamber and adapted to contact and depart from the first valve seat; a second valve portion disposed in the second valve chamber and adapted to contact and depart from the second valve seat; and a stem portion that connects the first valve portion and the second valve portion and inserted through the insertion hole of the partition member, the main valve body being configured so that when the second valve portion comes into contact with the second valve seat, a portion of the first valve portion opposite to a portion that is adapted to contact and depart from the first valve seat comes into contact with the annular protruding portion of the partition member, to block the communication between the first valve chamber and the second valve chamber through the insertion hole.

* * * * *